(12) United States Patent
Jabara et al.

(10) Patent No.: US 9,749,861 B2
(45) Date of Patent: *Aug. 29, 2017

(54) SYSTEM AND METHOD FOR HANDSET OPERATION IN A WIRELESS COMMUNICATION NETWORK

(71) Applicant: Mobilitie, LLC, Newport Beach, CA (US)

(72) Inventors: Gary Bernard Jabara, Newport Beach, CA (US); Christos Karmis, Irvine, CA (US); David Brett Simon, Agoura Hills, CA (US); Lloyd Frederick Linder, Agoura Hills, CA (US)

(73) Assignee: Mobilite, LLC, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,600

(22) Filed: Oct. 31, 2016

(65) Prior Publication Data

US 2017/0046742 A1   Feb. 16, 2017

Related U.S. Application Data

(63) Continuation of application No. 14/706,894, filed on May 7, 2015, now Pat. No. 9,485,656, which is a
(Continued)

(51) Int. Cl.
*H04B 15/00*   (2006.01)
*H04W 12/06*   (2009.01)
(Continued)

(52) U.S. Cl.
CPC ........ *H04W 12/06* (2013.01); *G06Q 30/0239* (2013.01); *G06Q 30/0259* (2013.01);
(Continued)

(58) Field of Classification Search
CPC ....... H04W 12/06; H04W 4/008; H04W 4/04; H04W 4/021; G06Q 30/0267; G06Q 30/0239
(Continued)

(56) References Cited

U.S. PATENT DOCUMENTS

| 7,970,351 B2 | 6/2011 | Jabara |
| 8,190,119 B2 | 5/2012 | Jabara |

(Continued)

*Primary Examiner* — Md Talukder
(74) *Attorney, Agent, or Firm* — Davis Wright Tremaine LLP; Michael J. Donohue

(57) ABSTRACT

User equipment (UE) is configured to automatically detect the presence of an access point (AP) in any one of a plurality of venues and to transmit identification information to the AP to authenticate the UE. The venue receiving the authentication request transfers the authentication request and identification information to an authentication server to automatically authenticate the UE whenever it is carried inside a venue. The venues may be coupled to a Cloud network with the authentication information stored on the Cloud network. Whenever the UE enters any of the venues, the UE is automatically authenticated when it comes within range of any AP within any of the venues. The venue may use an application program interface to provide advertising, coupons, web links, images, audio, video, streaming video, and the like to the UE. The venue may direct the UE to a website or provide a link to the website.

20 Claims, 9 Drawing Sheets

Related U.S. Application Data continuation of application No. 13/604,418, filed on Sep. 5, 2012, now Pat. No. 9,055,439, which is a continuation-in-part of application No. 13/398,727, filed on Feb. 16, 2012, now Pat. No. 9,064,374, and a continuation-in-part of application No. 13/363,943, filed on Feb. 1, 2012, now Pat. No. 9,179,296, said application No. 13/398,727 is a continuation-in-part of application No. 13/093,998, filed on Apr. 26, 2011, now Pat. No. 8,995,923, said application No. 13/363,943 is a continuation-in-part of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.
*G07F 17/32* (2006.01)
*G06Q 30/02* (2012.01)
*H04L 29/08* (2006.01)
*H04W 4/02* (2009.01)
*H04W 4/04* (2009.01)
*H04W 4/00* (2009.01)
*H04W 88/02* (2009.01)
*H04W 88/08* (2009.01)

(52) U.S. Cl.
CPC ..... *G06Q 30/0261* (2013.01); *G06Q 30/0267* (2013.01); *G07F 17/3218* (2013.01); *G07F 17/3223* (2013.01); *H04L 67/02* (2013.01); *H04L 67/34* (2013.01); *H04W 4/008* (2013.01); *H04W 4/021* (2013.01); *H04W 4/04* (2013.01); *H04W 4/001* (2013.01); *H04W 88/02* (2013.01); *H04W 88/08* (2013.01)

(58) Field of Classification Search
USPC ....... 455/3.06, 414.1, 414.2, 41.2, 421, 507, 455/517
See application file for complete search history.

(56) References Cited

U.S. PATENT DOCUMENTS

| | | | | |
|---|---|---|---|---|
| 8,520,072 | B1* | 8/2013 | Slavin | G08B 13/19684 348/143 |
| 8,677,125 | B2* | 3/2014 | Brok | H04W 12/06 455/410 |
| 8,995,923 | B2 | 3/2015 | Jabara | |
| 9,055,439 | B2 | 6/2015 | Jabara | |
| 9,064,374 | B2* | 6/2015 | Jabara | G07F 17/3218 |
| 9,077,564 | B2 | 7/2015 | Jabara | |
| 9,137,495 | B2* | 9/2015 | Narasimhan | H04H 20/38 |
| 9,179,296 | B2 | 11/2015 | Jabara | |
| 9,485,656 | B2* | 11/2016 | Jabara | G07F 17/3218 |
| 2006/0236105 | A1* | 10/2006 | Brok | H04W 12/06 713/169 |
| 2007/0199076 | A1* | 8/2007 | Rensin | H04L 29/06027 726/27 |
| 2008/0220822 | A1* | 9/2008 | Park | G06F 3/0488 455/566 |
| 2009/0156170 | A1* | 6/2009 | Rossano | H04L 51/38 455/412.1 |
| 2009/0282130 | A1* | 11/2009 | Antoniou | H04L 41/0886 709/220 |
| 2010/0203833 | A1* | 8/2010 | Dorsey | G06F 17/30035 455/41.2 |
| 2011/0092222 | A1* | 4/2011 | Kuo | G01S 5/0009 455/456.1 |
| 2015/0245209 | A1* | 8/2015 | Jabara | G07F 17/3218 705/14.39 |

* cited by examiner

SYSTEM AND METHOD FOR HANDSET OPERATION IN A WIRELESS COMMUNICATION NETWORK

RELATED APPLICATIONS

This application is a continuation of U.S. application Ser. No. 14/706,894 filed on May 7, 2015, which is a continuation of U.S. application Ser. No. 13/604,418 filed on Sep. 5, 2012, which is a continuation-in-part of U.S. application Ser. No. 13/398,727 filed on Feb. 16, 2012 and a continuation-in-part of U.S. application Ser. No. 13/363,943 filed on Feb. 1, 2012, which are continuations-in-part of U.S. application Ser. No. 13/093,998 filed on Apr. 26, 2011, which is a continuation-in-part of U.S. application Ser. No. 12/958,296 filed on Dec. 1, 2010, which is a continuation-in-part of U.S. application Ser. No. 12/616,958 filed on Nov. 12, 2009, now U.S. Pat. No. 8,190,119, which is a continuation-in-part of U.S. application Ser. No. 12/397,225 filed on Mar. 3, 2009, now U.S. Pat. No. 7,970,351, the entire disclosures and content of which are hereby incorporated by reference in their entirety.

BACKGROUND OF THE INVENTION

Field of the Invention

The present invention is directed generally to wireless communication devices and, more particularly, to a system and method of handset operation to facilitate communication in dynamically formed short-range communication networks.

Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allows group members to communicate with each other using PTT technology. Thus, when one group member presses the PTT button, the communication from that individual is automatically transmitted to the communication devices of other group members. While this gives the appearance of direct communication between the wireless devices, the communications between group members are also relayed via one or more base stations as part of the wireless network.

Therefore, it can be appreciated that there is a need for wireless communication devices that can communicate directly with nearby wireless devices. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The system described herein extends the normal operational features of conventional wireless communication devices. As described above, the conventional wireless communication device communicates with a wireless communication network base station using a first transceiver (i.e., a network transceiver). The extended capabilities described herein provide a second transceiver device that allows wireless communication devices to communicate directly with each other over a short distance and further describes network management techniques capable of managing a dynamic network that may change quickly.

Figure 1:
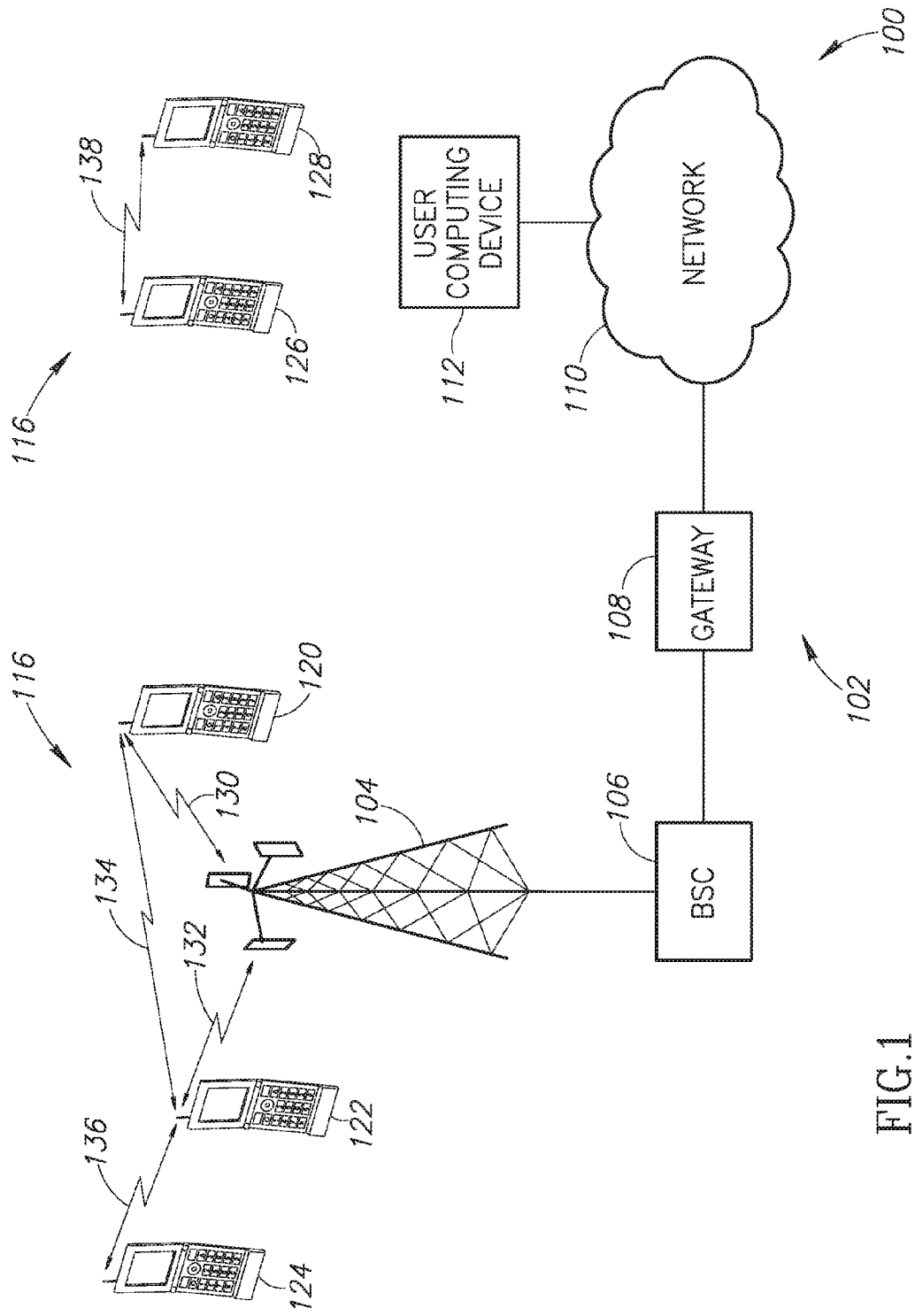
FIG. 1 is a diagram illustrating a system architecture configured to implement a communication system in accordance with the present teachings.

The wireless communication devices are illustrated as part of a system 100 illustrated in the system architecture in FIG. 1. Portions of the system 100 are conventional wireless network components that will be described briefly herein. The non-network communication capability, which may be referred to herein as a "jump-enabled" device or a "jump" device, will be described in greater detail below. The term "jump" refers to the ability of a wireless device designed and operated in accordance with the present teachings to jump from one short-range wireless network to another.

A conventional wireless communication network 102, such as a public land mobile network (PLMN), includes a base station 104. Those skilled in the art will appreciate that the typical wireless communication network 102 will include a large number of base stations 104. However, for the sake of brevity and clarity in understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the wireless communication network 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the wireless communication network 102 (e.g., CDMA vs. GSM). However, these elements are known in the art and need not be described in greater detail herein.

Also illustrated in FIG. 1 are wireless communication devices 120-128. The wireless communication devices 120-128 are illustrative of many different types of conventional wireless communication devices capable of communicating with the base station 104 or other base stations (not shown) in the wireless communication network 102. Those skilled in the art will appreciate that the wireless communication network 102 may communicate using a variety of different signaling protocols. For example, the system 100 may be successfully implemented using, by way of example, CDMA, WCDMA, GSM, UMTS, 3G, 4G, LTE, and the like. The system 100 is not limited by any specific communication protocol for the wireless communication network 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-128) contain a conventional transmitter/receiver or transceiver components to permit conventional communication with the wireless communication network 102 via the base station 104 or other base station (not shown). Operational details of conventional network communication are known in the art and need not be described in greater detail herein.

In addition to the conventional network transceiver components, the jump-enabled wireless communication devices illustrated in FIG. 1 (e.g., the wireless communication devices 120-128) also include a short-range transceiver to allow direct communication between the devices. This short-range communication is accomplished without reliance on the wireless communication network 102. Indeed, as will be described in greater detail below, the short-range transceivers in the mobile communication devices 120-128 permit the dynamic formation of a short-range communication network 116 that does not rely on the wireless communication network 102 provided by any wireless service provider. Thus, wireless communication devices can rely on the conventional wireless communication network 102 for some communications, but may also be part of the short-range communication network 116 formed between the mobile devices themselves. In the example of FIG. 1, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a short-range communication link 134.

As illustrated in FIG. 1, the wireless communication device 124 is not in communication with the wireless communication network 102. However, the wireless communication device 124 can communicate directly with the wireless communication device 122 via a short-range wireless communication link 136. Also illustrated in FIG. 1 are the wireless communication devices 126-128. Although neither of these devices is in communication with the wireless communication network 102, the two devices are in direct communication with each other via a short-range wireless communication link 138. Thus, jump-enabled wireless communication devices must be in proximity with each other, but need not be in communication with the wireless communication network 102 or even in an area of wireless coverage provided by the wireless communication network.

The dynamic formation of one or more short-range networks 116 allows communication between the wireless communications devices 120-128 independent of the wireless communication network 102 even if the wireless communication network 102 is present and operational. The short-range communication network 116 advantageously allows communication in settings where the wireless communication network 102 is not present or in a situation where the wireless communication network is unavailable. For example, the wireless communication network 102 may be unavailable during a power outage or an emergency situation, such as a fire, civil emergency, or the like. In contrast, the short-range communication network 116 does not rely on any infrastructure, such as cell towers, base stations, and the like. As will be described in greater detail below, the short-range communication network 116 may be extended as jump-enabled wireless communication devices move throughout a geographic location.

Figure 2:
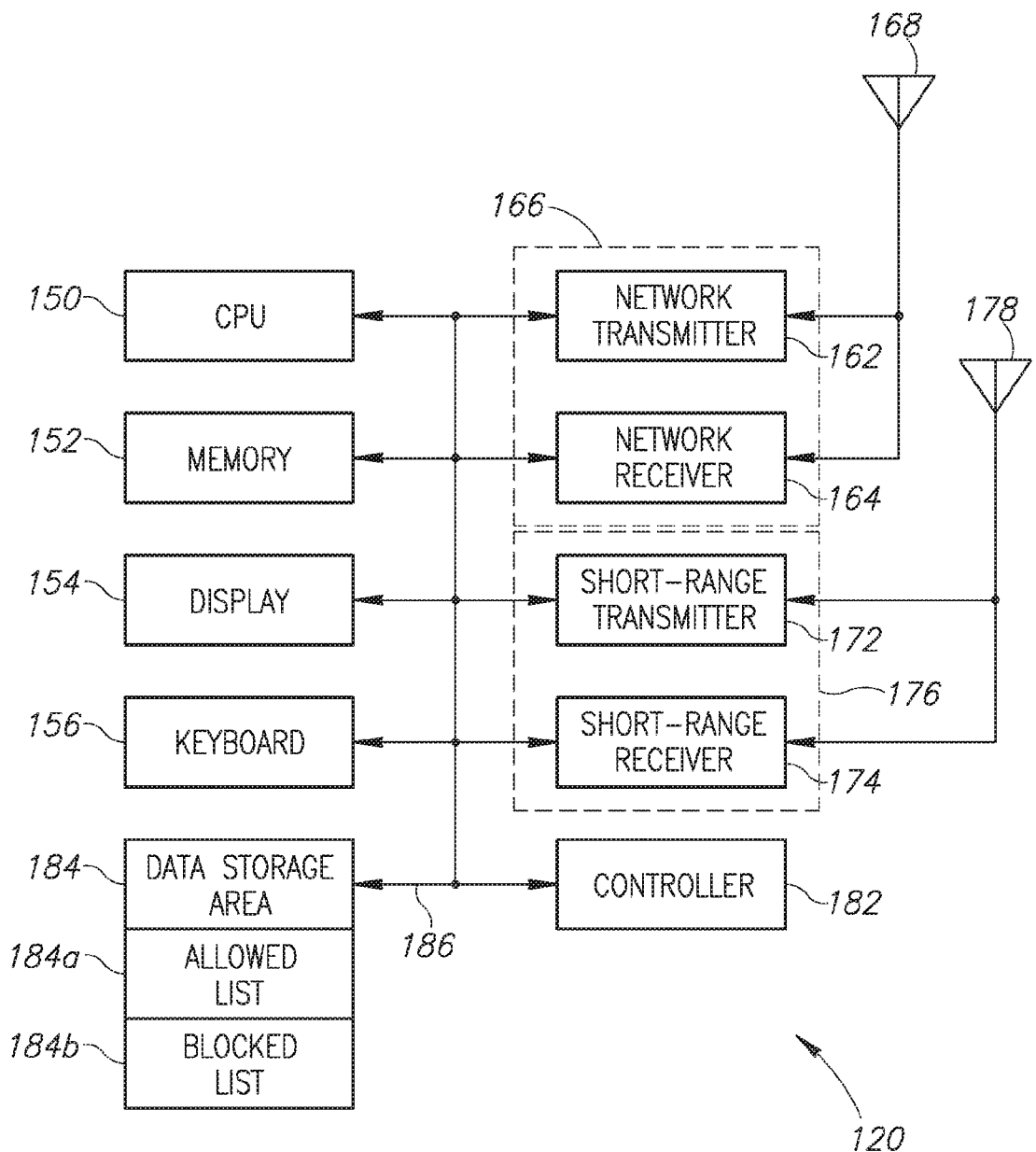
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. In general, the memory 152 stores instructions and data to control operation of the CPU 150. The memory 152 may include random access memory, read-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and a keypad or keyboard 156. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for the conventional wireless communication network with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the mobile communication devices 120-128) may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the wireless communication network 102 is well-known in the art and need not be described in greater detail herein.

The wireless communication device 120 of FIG. 2 also includes a short-range transmitter 172 that is used by the wireless communication device 120 for direct communication with other jump-enabled wireless communication devices (e.g., the wireless communication device 122 of FIG. 1). FIG. 2 also illustrates a short-range receiver 174 that operates in conjunction with the short-range transmitter 172 to communicate directly with other jump-enabled wireless communication devices (e.g., the wireless communication device 122 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components are implemented as a single antenna.

FIG. 2 also illustrates a controller 182 and a data storage area 184. As will be described in detail below, the controller 182 controls the exchange of data between wireless communication devices that become part of the short-range communication network 116. The data storage 184 contains user profile data and messaging data that will be exchanged between wireless communication devices in the short-range communication network 116. The data storage area 184 may be implemented as any convenient data structure. As will be described in greater detail below, the data storage area 184 contains data (e.g., messages, personal profile information of contacts, a geographical location tag for each contact, and the like) that will be exchanged between wireless communication devices. The data may be stored as a simple list, part of a database, or any other convenient data storage structure. The user profile can include a broad array of information such as user name, nickname, age, sex, education and work background, hobbies, food preferences (love sushi, Hunan, and Mediterranean food, etc.), and the like. In one embodiment, described in U.S. application Ser. No. 12/397,225, filed on Mar. 3, 2009, now U.S. Pat. No. 7,970,351, two wireless devices may exchange portions of user profile data to determine whether there is a suitable match between the users. If the phones determine that there is a suitable match based on the user profiles, an alert signal may be generated to indicate to the individual users that there is a person nearby that they should meet. In another embodiment, user profile data may be used in a business venue to determine appropriate marketing and advertisement data based on the user profile.

The data storage area 184 also stores a list of other nearby wireless communication devices that form part of the short-range wireless communication network 116. In addition, the data storage area 184 may include an Allowed List 184a and a Blocked List 184b in connection with device authentication. As will be described in greater detail below, the Allowed List 184a contains identities of nearby wireless communication devices and wireless hot spots that have been verified while the Blocked List 184b includes a list of nearby wireless communication devices that have been determined not to be authentic or which the user, a their own discretion, has decided to block.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

As will be discussed in greater detail below, the user can download an application programming interface (API) that will control operation of the wireless communication device and enable the formation of the short-range communication network 116. In addition, when the wireless communication device is coupled to a WiFi hotspot, such as in a business venue, the API can operate in conjunction with the computer system of the business venue to actively control the user experience on the wireless communication device.

In an exemplary embodiment, the short-range transceiver 176 may be designed for operation in accordance with IEEE standard 802.11, sometimes referred to as WiFi. Many modern wireless communication devices are equipped with WiFi and may be readily upgraded to support the functionality described herein. Because the wireless communication devices 120-128 all include WiFi capability, short-range communication networks 116 may be formed even though the wireless communication devices may be designed to operate with incompatible wireless communication networks 102. For example, the wireless communication device 122 may be configured for operation with a GSM implementation of the wireless communication network 102. The wireless communication device 124 may be configured for operation with a CDMA implementation of a wireless communication network 102. Even though the wireless communication devices 122-124 are incompatible with respect to the respective wireless communication networks 102, the wireless communication devices 122-124 may still communicate directly with each other via the short-range communication network 116. Thus, the wireless communication devices 120-128 may operate compatibly to form the short-range communication networks 116 even though the network transceivers 166 (see FIG. 2) may operate with different incompatible wireless communication networks 102. In one embodiment, when the jump-enabled wireless communication device 120 comes within range of any other jump-enabled wireless communication device (e.g., the wireless communication device 122 of FIG. 1), it establishes a short-range wireless communication link (e.g., the short-range wireless communication link 134).

Various techniques for establishing the short-range communication network 116 (see FIG. 1) are described in U.S. application Ser. No. 12/397,225 filed on Mar. 3, 2009, now U.S. Pat. No. 7,970,351, U.S. application Ser. No. 12/616,958 filed on Nov. 12, 2009, U.S. application Ser. No. 12/958,296, filed on Dec. 1, 2010, and U.S. application Ser. No. 13/093,998 filed on Apr. 26, 2011, the entire disclosures and content of which are hereby incorporated by reference in their entirety.

As will be discussed in greater detail below, the system 100 goes beyond some of the conventional operation of WiFi standards to permit a large number of wireless communication devices to communicate directly with each other. In one embodiment, a local hot spot is used to initiate the formation of the short-range communication network 116. Once established, the short-range communication network 116 may continue to exist even if the hot spot (or group owner) is no longer present. In yet another alternative embodiment, described below, the wireless communication devices may be pre-programmed to utilize a common SSID, IPrange, and port to spontaneously form a short-range communication network 116 even in the absence of any hot spot.

In an exemplary embodiment of the system 100, each wireless communication device (e.g., the wireless communication devices 120-128) transmits a beacon signal with the same SSID, such as the SSID "JUMMMP" to identify the device as a jump-enabled wireless communication device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS) or a frequency hopping spread spectrum (FHSS) operational modes. These conventional WiFi parameters are known in the art and need not be described in greater detail herein.

In addition, since there is no access point, all jump-enabled wireless communication devices take on the responsibilities of the MAC layer that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the PHY layer, the transceiver may operate in a DSSS or a FHSS operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-128 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the jump-enabled wireless communication devices actively seek to establish links with other jump-enabled devices to automatically establish a short-range communication network 116.

Figure 3:
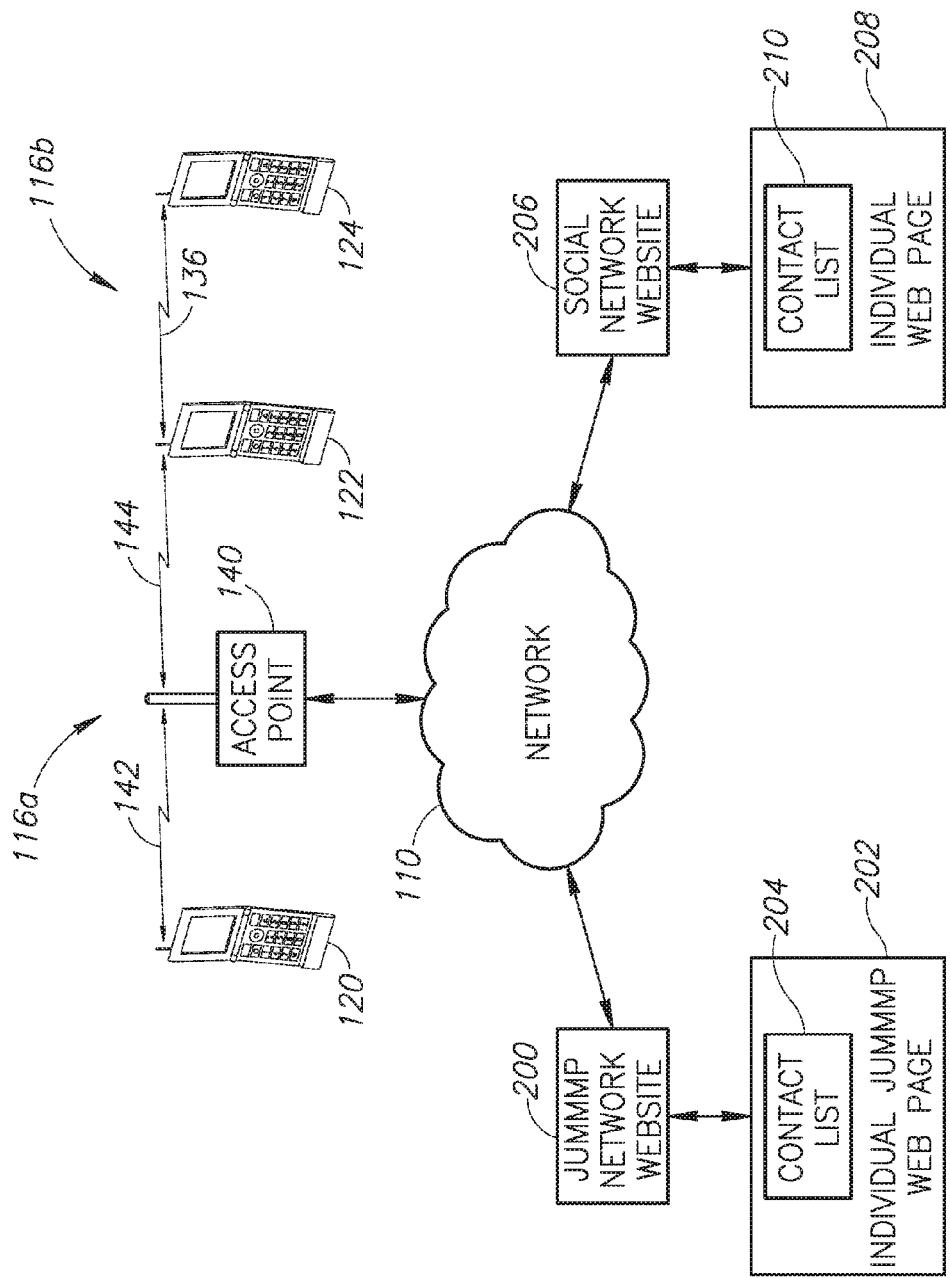
FIG. 3 illustrates an embodiment of the system of FIG. 1 using an access point as part of a network.

In yet another alternative embodiment, illustrated in FIG. 3, the jump-enabled wireless communication devices (e.g., the wireless communication devices 120-122) may communicate with an access point 140, such as a WiFi base station, WAP, wireless router, or the like. As will be described in greater detail below, a wireless communication device (e.g., one of the wireless communication devices 120-124) may function as the access point 140 to permit others of the wireless communication devices in the short range communication network 116 to access the network 110 via the wireless communication device serving as the access point. FIG. 3 illustrates a wireless communication link 142 established between the access point 140 and the wireless communication device 120. Similarly, the wireless communication device 122 establishes a wireless communication link 144 with the access point 140. Thus, a short-range communication network 116a is formed in conjunction with the access point 140. To assist in a better understanding of the present disclosure, short-range communication networks will be generally referred to by the reference 116. Specific examples of short-range communication networks will be referred to by the reference 116 and an alphabetic identifier (e.g., the short-range communication network 116a in FIG. 3).

Depending on the physical proximity of the wireless communication devices 120-124, there may be one or more short-range communication networks 116 formed. In the example of FIG. 3, the wireless communication devices 120-122 are both within range of the access point 140. Therefore, the first short-range communication network 116a can be formed with the wireless communication devices 120-122 and the access point 140.

The wireless communication device 124 is within range of the wireless communication device 122, but is not within range of the access point 140. In one embodiment, the wireless communication device 124 may be become part of the short-range communication network 116a via the wireless communication device 122. In this embodiment, the wireless communication device 122 functions as a "repeater" or relay to relay information between the wireless communication device 124 and other parts of the short-range communication network 116a. In another embodiment, a second short-range communication network 116b is formed with the wireless communication devices 122-124. In this exemplary embodiment, the wireless communication device 122 is part of both short-range communication networks 116a-116b. The wireless communication device 122 may simultaneously be a member of both short-range communication networks 116a-116b or may be logically connected to both short-range communication networks 116a-116b by alternately switching between the short-range communication networks 116a-116b.

The access point 140 is coupled to the network 110 in a conventional manner. This can include a wired or wireless connection directly to the network 110 or via an intermediate network gateway, such as those provided by an Internet Service Provider (ISP). FIG. 3 also illustrates a JUMMMP Network website 200, which may support an individual web page 202 for each member (e.g., an individual person, business, organization, etc.) of the JUMMMP Network. FIG. 3 also illustrates a generic conventional social network website 206, which may support an individual web page 208 for each member of the social network. The JUMMMP network website 200 and social network website 206 are each coupled to the network 110. Although illustrated in FIG. 3 as two separate network websites, those skilled in the art will appreciate that the JUMMMP website 200 can effectively function as a social network website. Similarly, the JUMMMP website technology can be incorporated into existing social network websites. Thus, the two separate websites illustrated in FIG. 3 can effectively be combined into a single website.

As discussed in detail in co-pending U.S. application Ser. No. 12/616,958, filed on Nov. 12, 2009 and assigned to the assignee of the present application, the user of a jump-enabled wireless communication device (e.g., the wireless device 120) may use the web-browsing capability of the wireless communication device to access the individual JUMMMP web page 202 for the individual with whom contact has just been made to learn more about that individual. Alternatively, the user of a jump-enabled wireless communication device (e.g., the wireless device 120) may use the web-browsing capability of the wireless communication device to access the user's own individual JUMMMP web page 202 to store information for the individual with whom contact has just been made. A contact list 204, which is typically a portion of the individual JUMMMP web page 202 is configured to store contact information. Similarly, the individual web page 208 of the social network 206 can include a contact list 210 to store contact information. In one embodiment, the contact information may include a user profile exchanged along with individual messages between users. As will be discussed in greater detail below, the user profile can include user name and preferences, as well as information about the specific exchange of messages. For example, the user profile can include the date and time at which messages were exchanged, geo-location data (e.g., latitude and longitude) of the sender of a message, and the like, and can also be stored as user profile data in the contact list 204. Applications for the profile data are described in greater detail below.

The wireless communication devices 120-128 (see FIG. 1) generally have sufficient memory capacity to temporarily store contact information. In an exemplary embodiment, the wireless communication device (e.g., the wireless communication device 120) can temporarily store new contact information until access to the network 110 becomes available at a later time. In addition, the wireless communication device 120 can store designated contact information (e.g., "Favorites") on a more permanent basis. Long-term storage of contact information requires access to the network 110. In the embodiment of FIG. 1, access to the network 110 may be provided via the base station 104 in a conventional manner. The wireless communication device 122 may access the network 110 by communicating directly with the base station 104. In the embodiment of FIG. 3, access to the network 110 may be provided via the access point 140, as described above. For example, the wireless communication device 122 in FIG. 1 may access the network 110 by communicating directly with the access point 140 via the short-range communication link 144. Alternatively, the wireless communication device 122 can access the network 110 and the JUMMMP network website 200 via the wireless communication link 132 to the base station 104. Network access via the gateway 108 is well known in the art and need not be described in greater detail herein.

In an alternative embodiment, access to the network 110 may be provided via another jump-enabled wireless communication device. For example, in FIG. 1, the wireless communication device 122 can communicate with the base station 104 via the wireless communication link 132 while the wireless communication device 124 cannot communicate directly with the base station. However, the wireless communication device 124 is in proximity with the wireless communication device 122 and can communicate with the wireless communication device 122 via the wireless communication link 136 as part of the short-range communication network 116. In this embodiment, the wireless communication device 124 can use the wireless communication device 122 as a repeater or relay to allow the wireless communication device 122 to access the network 110 via the wireless communication device 122 and the base station 104.

Similarly, in the embodiment of FIG. 3, the wireless communication devices 120-122 can communicate directly with the access point 140 via the wireless communication links 142-144, respectively. The wireless communication devices 120-122 can also communicate with each other via the access point 140 thus forming the short-range communication network 116*a*. As seen in FIG. 3, the wireless communication device 124 cannot communicate directly with the access point 140. However, the wireless communication device 124 is in proximity with the wireless communication device 122 and can communicate with the network 110 via the wireless communication device 122 and the access point 140.

Figure 4:
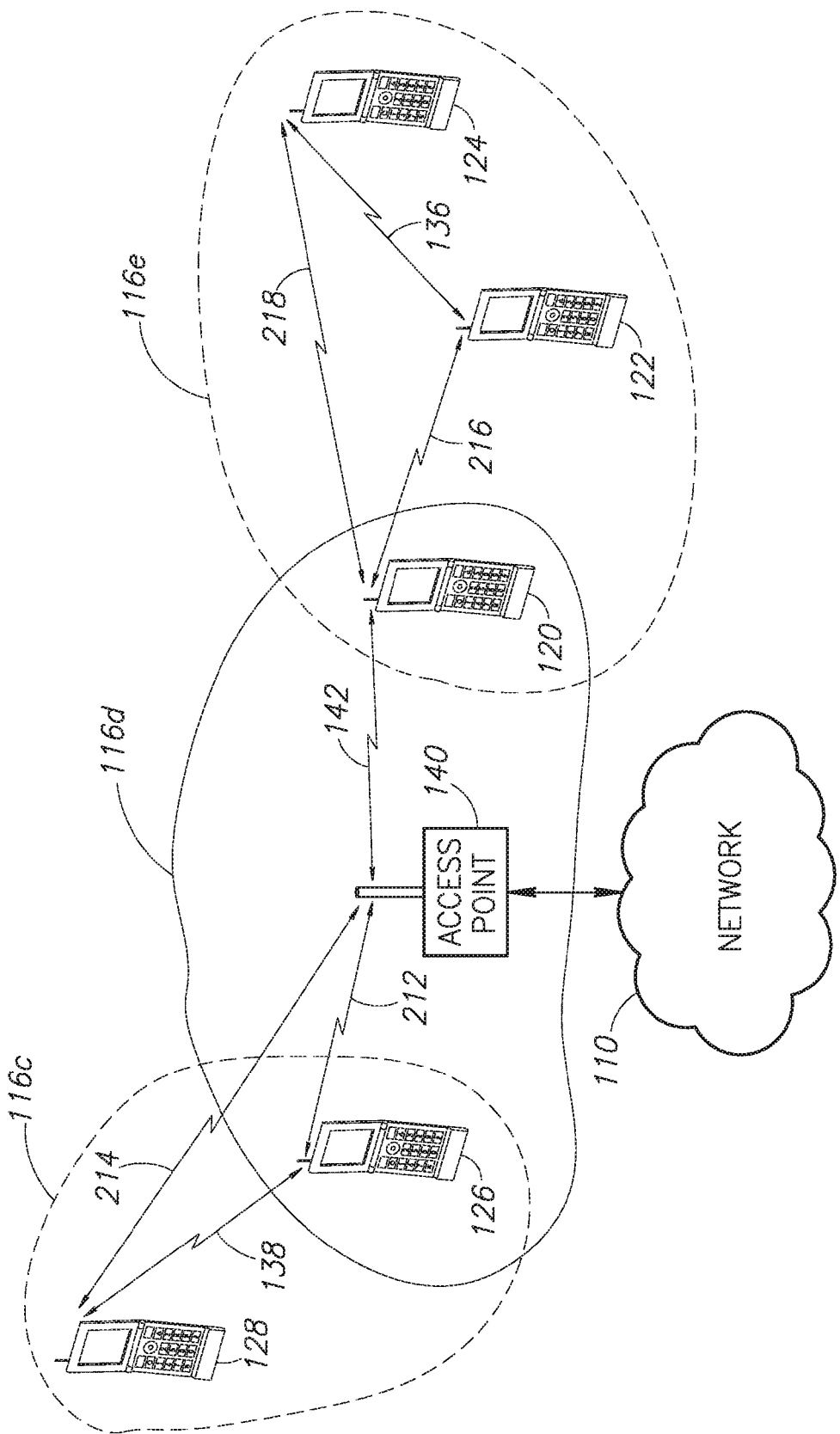
FIG. 4 illustrates a dynamic network topology using an access point.

As previously noted, the system 100 provides for the dynamic formation and rapid change in the topography of the short-range communication networks 116. For example, FIG. 1 illustrates a first short-range communication network 116 formed with the wireless communication devices 120-124 and a second short-range communication network 116 formed between the wireless communication devices 126-128. FIG. 4 illustrates the dynamic nature of the wireless communication networks 116. For example, if the wireless communication device 128 is initially within range of the wireless communication device 126, but out of range of the access point 140, the wireless communication devices 126-128 may form a short-range communication network 116*c* using the short-range communication link 138. If the wireless communication device 126 comes within range of the access point 140, a wireless communication link 212 is formed. In that event, the wireless communication device 126 may become part of a short-range communication network 116*d* formed between the access point 140 and the wireless communication devices 120 and 126. At this particular moment in time, the mobile communication device 126 may be part of both the short-range communication network 116*c* and the short-range communication network 116*d*. As discussed above, the wireless communication device 126 may actually be part of both the short-range communication networks 116*c*-116*d* or may logically be connected to both the short-range wireless communication networks by switching back and forth between the short-range communication networks 116*c*-116*d*. The logical switching between the short-range communication networks 116*c*-116*d* is transparent to the user. Other examples of the short-range communication network 116 are described below in which no access point 140 is present.

Alternatively, the wireless communication device 128 may become part of the short-range communication network 116*d* using the wireless communication device 126 as a relay to the access point 140. If, at a later time, the wireless communication device 128 comes within range of the access point 140, a wireless communication link 214 is formed there between. At that point in time, the short-range communication network 116*c* effectively ceases to exist since the wireless communication devices 126-128 are now part of the short-range communication network 116*d*.

The wireless communication device 120 may be part of the short-range communication network 116*d* by virtue of the short-range communication link 142 coupling the wireless communication device 120 to the access point 140. If the wireless communication device 120 comes within range of the wireless communication devices 122-124, wireless communication links 216-218 will be formed to couple the wireless communication devices 120-124 and thereby dynamically form a short-range communication network 116*e*. At this point in time, the wireless communication device 120 may simultaneously be part of the short-range communication network 116*d* and the short-range communication network 116*e*. Alternatively, the wireless communication devices 122-124 may become part of the short-range communication network 116*d* via the wireless communication device 120.

If the wireless communication device 120 subsequently moves out of range of the access point 140, the wireless communication link 142 is broken. Therefore, there will no longer be an overlap between the short-range communication networks 116*d*-116*e*. The wireless communication device 120 would remain part of the short-range communication network 116*e* so long as it remains within range of the wireless communication device 122, the wireless communication device 124, or both. Thus, those skilled in the art will appreciate that short-range communication networks are dynamically formed, modified, and dissolved as the wireless communication devices move in and out of range with each other and central points, such as the access point 140. Furthermore, if the wireless communication device 120 comes back into range of the access point 140, the wireless communication link 142 can be reestablished. When this happens, all prior communications from the short-range communication network 116*e* will be transferred to the short-range communication networks 116*d* and 116*c* (and vice-versa) through the re-echoing function described above. That is, the various wireless communication devices will resynchronize the data in the data storage area 184 (see FIG. 2). Those skilled in the art will also appreciate that the short-range communication networks 116 may be formed, modified, and dissolved without the presence of the access point 140.

FIG. 4 illustrates the wireless communication device 120 as a key component in the short-range communication network 116*e* because it connects the wireless communication devices 122-124 to the access point 140. If the wireless communication device 120 suddenly moved out of range of the access point and/or the wireless communication devices 122-124 that connection may be broken. Similarly, if the user of the wireless communication device 120 suddenly turned off the device, the link between the short-range communication network 116*e* and the access point 140 would disappear. The wireless communication devices 122-124 still communicate with each other via the wireless communication link 136 and will still search for other wireless communication devices with which to connect. In addition, either of the wireless communication devices 122-124 will attempt to find the access point 140 or a hot spot from which either of the wireless communication devices may access the network 110.

FIG. 4 illustrates a sparse network with only five wireless communication devices. However, those skilled in the art can appreciate that there may be a very large number of wireless communication devices in proximity with each other. For example, if FIG. 4 is illustrative of a large shopping mall or a university campus, there may be hundreds of wireless communication devices within range of each other and/or the access point 140. Thus, the short-range communication networks 116 may be large and extensive. There may be a large number of wireless communication devices that are simultaneously present in two or more short-range communication networks 116. In addition, many wireless communication devices would provide overlapping coverage with multiple short-range communication networks 116. In this scenario, the entire mall and surrounding parking area could be effectively covered by a mesh network comprising dozens or hundreds of short-range communication networks 116. Thus, in the situation illustrated in FIG. 4 where the wireless communication device 120 is turned off or moved out of range of other wireless communication devices is less likely to cause the total isolation of the short-range communication network 116*e*. If the wireless communication device 120 were suddenly removed, either by powering down or by the departure from the area, many other wireless communication devices (not shown) in the same proximity would be able to replace the connectivity between the short-range communication network 116*e* and the access point 140.

Whenever a wireless communication device (e.g., the wireless communication device 124) comes within range of other wireless communication devices, a short-range wireless communication network (e.g., the short-range wireless communication network 116*e*), the wireless communication devices exchange message data with each other to thereby synchronize message data in the data storage area 184 (see FIG. 2). At the end of the synchronization process, the data storage area 184 of each wireless communication device will contain the same message data, although messages may not be in the same sequence. In the example described above, when the wireless communication device 124 comes within range of the wireless communication device 120 and/or the wireless communication device 122, the wireless communication links 136 and 218 are formed. Because the wireless communication device 124 has just joined the short-range communication network 116*e*, the data storage area 184 of the wireless communication device 124 will not be synchronized with the data storage area of other wireless communication devices in the short-range communication network 116*e*. During the synchronization process, the wireless communication device 124 transmits message data in its data storage area 184. The wireless communication devices 120 and 122 receive the message data. The controller 182 (see FIG. 2) in each wireless communication device receives the message data and merges the messages with the message data already stored within the data storage area 184 of the wireless communication devices 120 and 122, respectively. The controller 182 in each of the wireless communication devices may also eliminate duplicate messages. In this manner, each wireless communication device manages the message data within its data storage area 184.

As part of the synchronization process, the wireless communication devices 120 and 122 may also transmit the message data within their respective data storage areas 184. The wireless communication device 124 receives the messages from the wireless communication devices 120 and 122 and merges the newly received messages in the data storage area 184 of the wireless communication device 124. As described above, the controller 182 (see FIG. 2) of the wireless communication device 124 may eliminate duplicate messages within its data storage area 184. Following this synchronization process, all wireless communication devices in the short-range communication network 116*e* will have identical messages.

In an exemplary embodiment, the messages may be categorized as Public Messages, Group Messages, Direct Messages, and Status Messages. Public Messages may be transmitted to anyone within range of the wireless communication device (e.g., the wireless communication device 120). This may include emergency messages, messages broadcast from a retailer, and the like. Group Messages are intended for a specific group or organization, such as a scout group or employees of a particular company or any formed group. Direct Messages are private messages intended for a specific individual. In addition, the wireless communication device 120 may transmit Status Messages, which can include, by way of example, a list of other wireless communication devices in the particular short-range communication network 116, a list of recent wireless communication devices in the particular short-range communication network, a list of other short-range communication networks in which the wireless communication device was recently a member, or the like. The data message process described above can include one or more of these message categories. Other message categories may be created as necessary.

U.S. patent application Ser. No. 13/093,998, entitled "SYSTEM AND METHOD FOR MANAGEMENT OF A DYNAMIC NETWORK USING WIRELESS COMMUNICATION DEVICES," FILED ON Apr. 26, 2011, and incorporated by reference in its entirety, provides additional details of the message exchange process. As described therein, the Public and Group Messages may be contained in one file and all Direct Messages contained in a separate file. The messages have a main header and individual message headers. The main header may include, by way of example, the date/time of the last modification, message count, the date/time of the last synchronization and the user name of the wireless communication device with which the last synchronization was performed. This information may help maintain synchronization between wireless devices. The individual message headers can also include geo-location data (e.g., latitude and longitude) of the message sender.

The message data may include, but is not limited to, text message data, audio data, video data, multimedia data, or the like. As those skilled in the art will appreciate, Public Messages may be received and processed by any wireless communication device. In contrast, Group Messages may only be processed by a member of the designated group, while a Direct Message may only be processed by the individual wireless communication device for whom the message is intended.

Synchronization may occur directly between the wireless communication devices or via the access point 140 illustrated in FIG. 4. For example, message synchronization can occur between the wireless communication device 120 and the wireless communication device 126 using the access point 140. In addition, as will be described in greater detail below, wireless communication devices can carry message data as they move from one short-range communication network to another.

In another embodiment, a retail business may broadcast Public Messages to nearby wireless communication devices. In an exemplary embodiment, the retail facility can set up a wireless access point (e.g., the wireless access point 140 in FIG. 3) to establish a short-range communication network 116. For example, a retail facility in a shopping mall can transmit advertisement messages to nearby wireless communication devices. In a typical embodiment, these would be Public Messages that are freely relayed from one wireless communication device to another and from one short-range wireless communication network 116 to another. Using this form of message distribution, an advertisement from a retail facility will soon be disseminated to all wireless users in the area. The advertisements may take the form of text messages or any other data message described above.

In another aspect, an individual user may register with a business. Whenever the user comes within range of the short-range communication network 116 associated with the retail business, message data may be exchanged thus enabling the business to identify a particular user that is nearby. In this embodiment, the retail business may send a private advertisement message to the particular user. The private advertisement may be customized for the user based on a number of factors, such as the user's profile (e.g., the sex, age, and interests of the user), prior shopping patterns, or the like. It can also be based on statistical and history data that the retail business has collected on the user in one or more short-range communication networks 116 in the region around the retail business. For example, if a particular user has registered with a restaurant and comes within range of the short-range communication network 116 of that restaurant at a subsequent time after registration, the restaurant can send a private advertisement message to entice that user into the restaurant by offering a discount on a meal previously purchased by that user. If the user is a sports enthusiast, a sports bar could send a message that a particular sporting event (e.g., the user's college football team) is ongoing and offer a discount on a meal. In this manner, highly customized advertisements may be sent to individual users.

In some situations, the user may not be within range of the short-range communication network 116 of the restaurant, but may still be nearby. Because the wireless communication devices in the various short-range communication networks 116 relay messages, any message from a particular user may be relayed to the retail business via one or more short-range communication networks 116. Thus, a business at one end of a mall may detect the arrival of a particular user at the opposite end of the mall and still transmit a customized advertisement message to that user.

Furthermore, if the user has downloaded the API, discussed briefly above, the wireless communication device can automatically seek out and automatically connect to venues that have previously been registered as authenticated vendors. This may include business venues (e.g., shopping malls, clothing stores, sports bars, restaurants, and the like). In this embodiment, the wireless communication device can detect the access point 140 of a particular venue and determine whether it is an authenticated vendor. In one embodiment, an authenticated vendor will appear on the allowed list 184a (see FIG. 2) so that the wireless communication device can automatically authenticate the venue and establish a communication link with the access point 140 of that authenticated vendor. As will be described in greater detail below, the authenticated vendor can use the established communication link to provide a variety of data to the wireless communication device. This can include advertising, point-of-sale (POL) applications, multi-cast streaming video, audio data, image data, and the like. Further details of the API and interaction between the wireless communication device and a venue using the API will be discussed in greater detail below.

Figure 5:
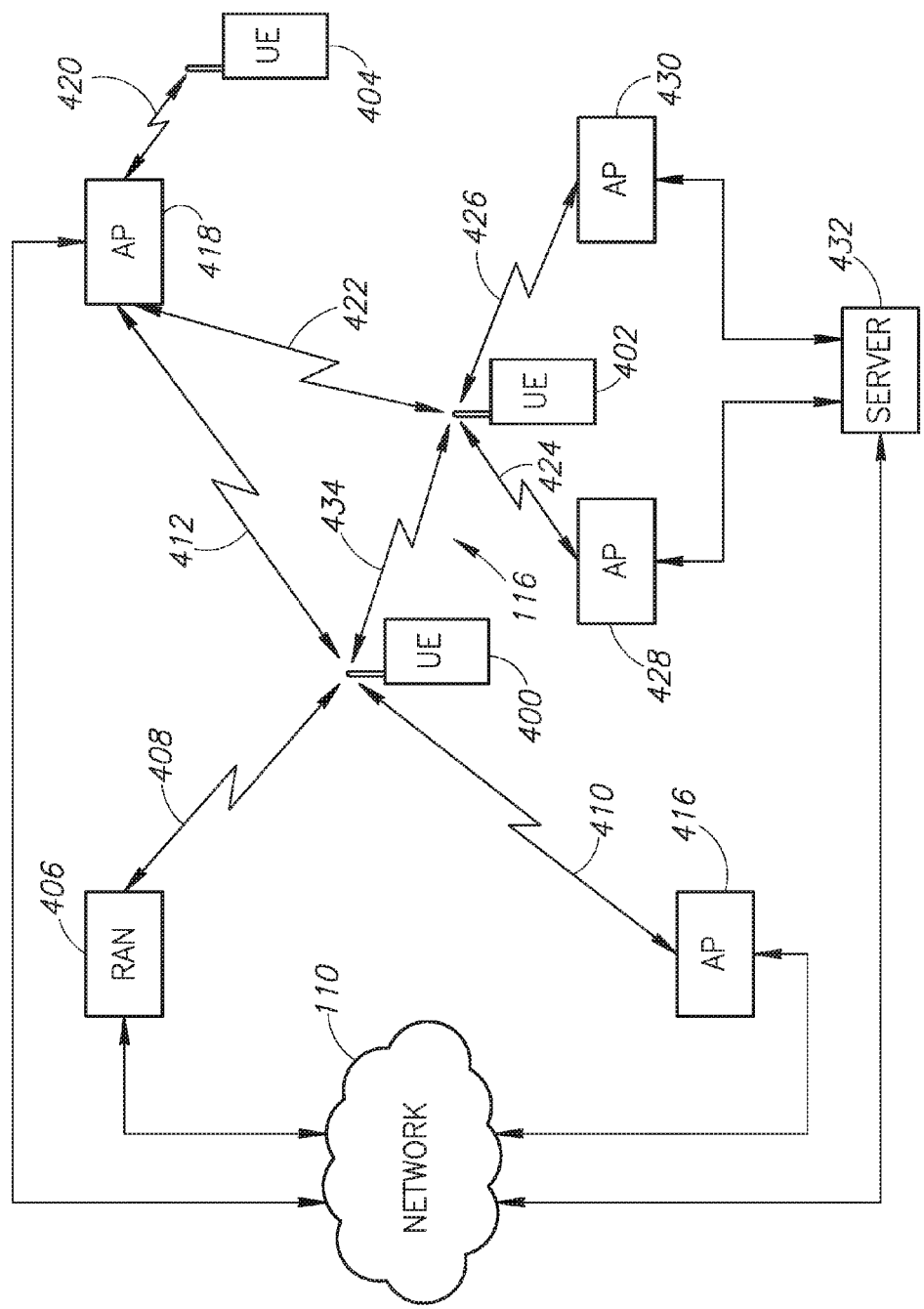
FIG. 5 is an example network architecture of a dynamic network illustrating communication between user equipment, wireless access points, and a wireless service provider network.
Figure 6:
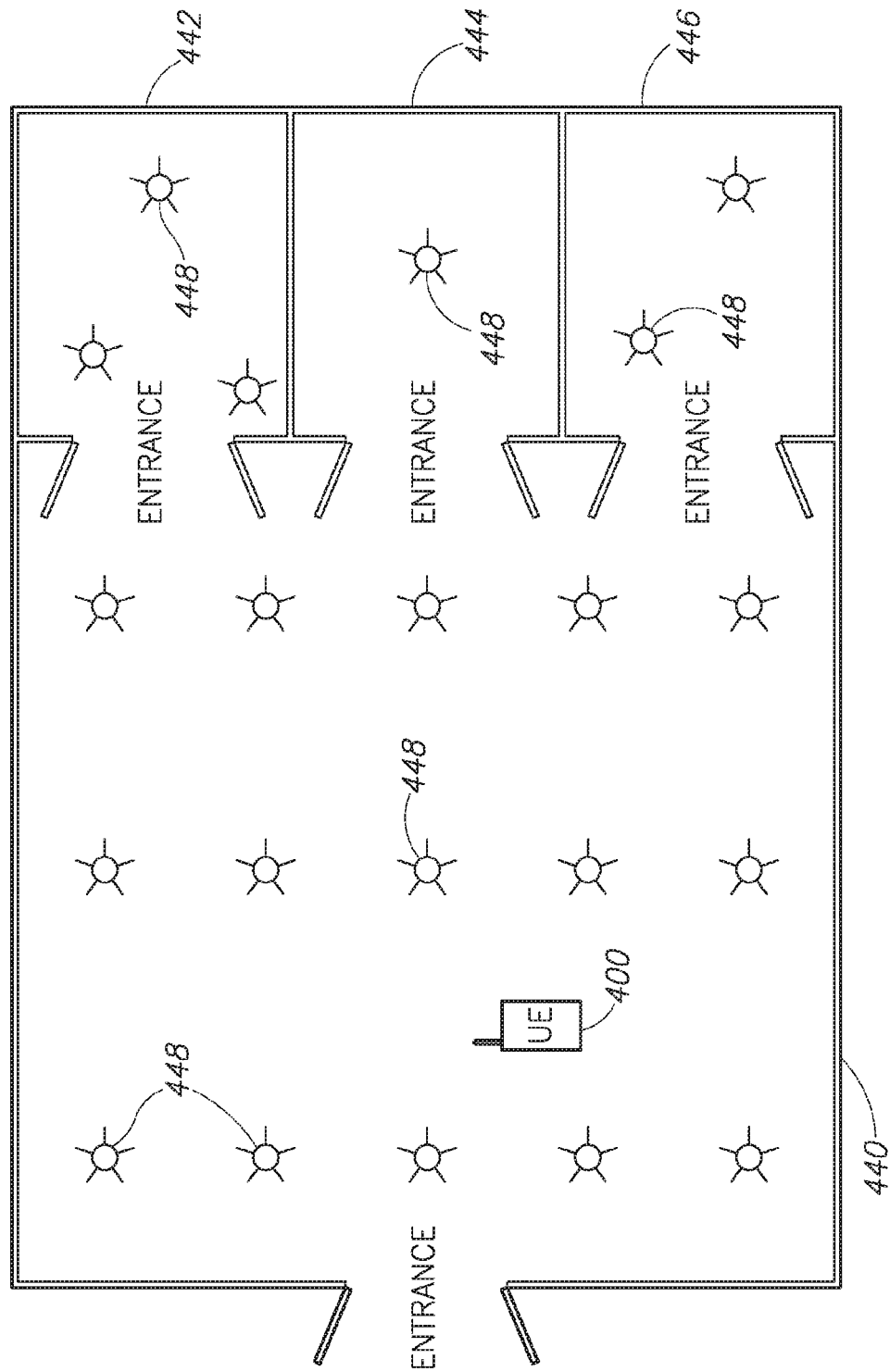
FIG. 6 illustrates a venue with a large number of distributed wireless access points.
Figure 7:
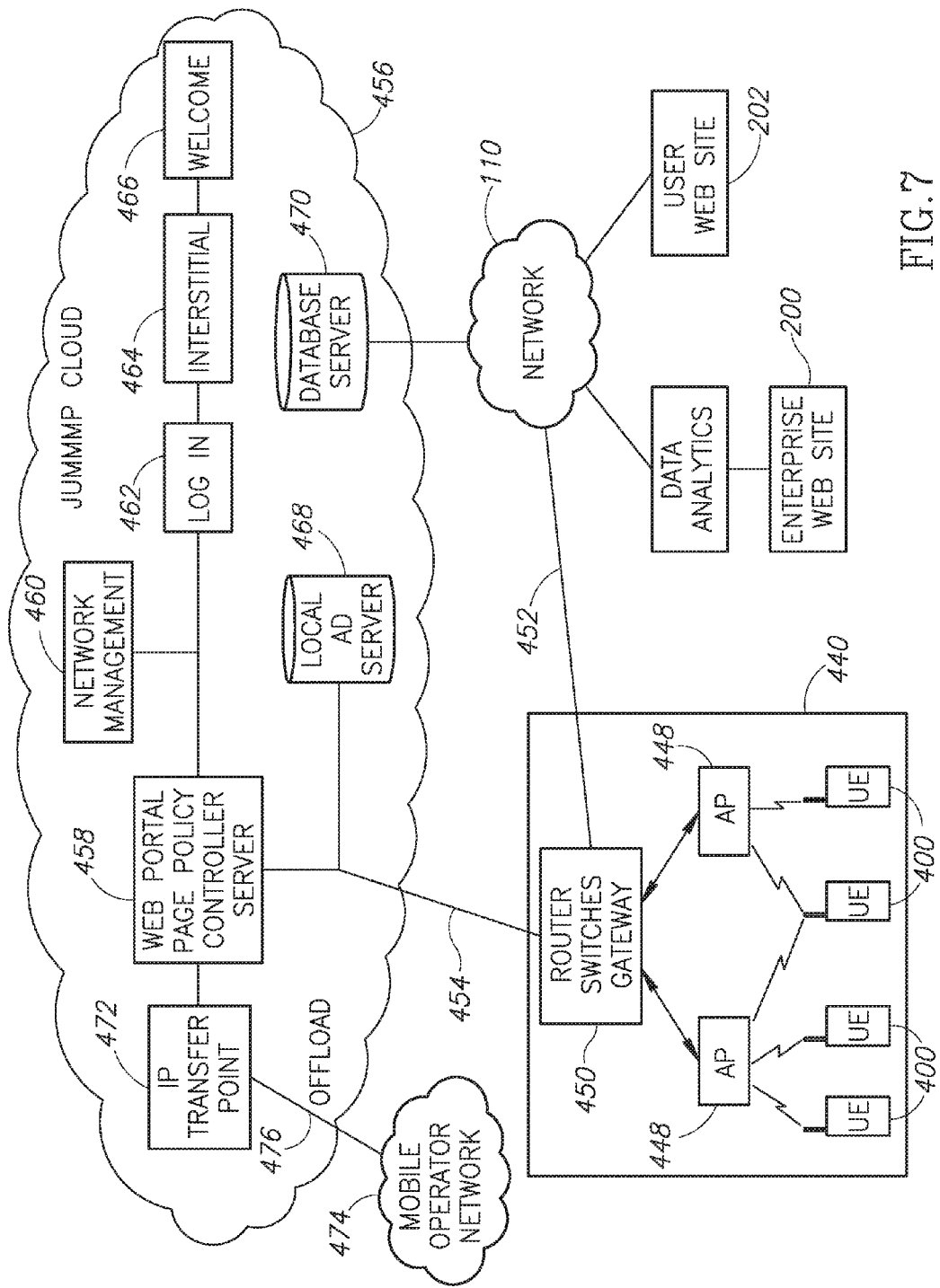
FIG. 7 illustrates a system architecture in which a venue communicates with a Cloud network.

In another example, a wireless communication device may communicate with multiple vendors within a particular venue and receive information that varies from one venue to another. This is illustrated in FIGS. 5-7. In FIG. 5, wireless communication devices are referred to generically as user equipment (UE). The term UE is intended to include any wireless communication device capable of processing audio, video, and text messaging. This includes smart phones, laptops, PDAs, computer tablets (e.g., an iPad™), and the like.

FIG. 5 illustrates UEs 400-404 in a venue such as a shopping mall. The UE 400 uses the network transceiver 166 (see FIG. 2) to communicate with a radio access network (RAN) 406. The RAN 406 is intended to generically represent a base station (e.g., the base station 104 in FIG. 1) and any associated support circuitry. The UE 400 establishes a wireless communication link 408 with the RAN 406 in a conventional manner.

FIG. 5 also illustrates wireless communication links 410-412 coupling the UE 400 with access points (APs) 416-418, respectively. In a typical shopping mall setting, the APs 416-418 may be associated with different individual stores in the shopping mall or associated generally with the shopping mall and provide data for one or more individual stores within the shopping mall. The APs associated with different stores will each have a different feature set and are controlled by a separate server. Each AP may have its own operational policy and policy server or policy engine. In addition, each AP may or may not allow device-to-device communication (i.e., communication between the UEs). Furthermore, each AP may or may not allow access to the Internet (e.g., the network 110). For example, the AP 416 may or may not allow the UE 400 to access the network 110 based on the particular policies implemented by the AP 416.

In one embodiment, the UE (e.g., the UE 400) must log on and register with each AP (e.g., the AP 416) in order to establish the wireless communication link 410 to receive ads or other content from the AP 416. As the UE moves into range of another AP (e.g., the AP 428), the UE 400 can perform another log on and authentication process with the new AP. In an alternative embodiment, described in greater detail below, the various stores may become part of a larger Cloud network. The API will permit automatic authentication of a UE whenever it comes within range of an AP that is part of the Cloud network (the vendor is an authenticated vendor on the Cloud network).

FIG. 5 also illustrates the UE 404 communicating with the AP 418 via the wireless communication link 420. The UE 402 also communicates with the AP 418 via a wireless communication link 422. In FIG. 5, the UE 402 establishes wireless communication links 424-426 with APs 428-430, respectively. In the example if FIG. 5, the AP 428 and the AP 430 may be co-located in the same store and are coupled to a server 432. In this embodiment, the two APs 428-430 form a network back bone that creates a tether for multiple phones within the store in which the APs are located. As the customer moves throughout the store, the API will cause the UE 402 to connect to the AP 428 or the AP 430 depending on the signal strength. If other UEs come within range of the all the APs 428-430, the UEs may communicate for all the purposes described above either directly or via the WiFi AP mesh network formed by the APs 428-430.

As will be described in greater detail below, the server 432 may control the flow of data to and from the UE 402 via the AP 428 and/or the AP 430. Those skilled in the art will appreciate that the APs (e.g., the AP 416) can be implemented in a variety of fashions. In one embodiment, the AP 416 may be directly coupled to a service provider. For example, the AP 416 may be implemented as a cable modem with wireless connectivity for the UE 400. In another embodiment, the AP 416 may be coupled to a computer (not shown) which controls operation of the AP 416 as well as controlling communications with the network 110. In this embodiment, the network 110 may be a wide area network, such as the internet.

In addition to the various wireless communication links between the UE 400 and the RAN 406 and/or the AP 416-418, the API will cause the UE 400 to establish a wireless communication link 434 with the UE 402. The wireless communication link 434 is established using the short-range transceiver 176 (see FIG. 2) thus permitting the UE 400 and 402 to establish the short-range communication network 116. The short-range communication network 116 in FIG. 5 operates in a manner described above.

In the example of FIG. 5, the AP 416 and AP 418 may be access points for different businesses. As the UE 400 moves within range of the AP 416, the wireless communication link 410 is established and the AP 416 may disseminate business information, such as messages, coupons, advertisements, and the like. Similarly, when the UE 400 moves within range of the AP 418, the wireless communication link 412 is established and the UE 400 may receive business information from the AP 418. In the example of FIG. 5, some or all of the information received from the AP 416 via the wireless communication link 410 may be relayed from the UE 400 to the UE 402 via the wireless communication link 434. Thus, information from the business associated with the AP 416 may be disseminated to other UEs (the UE 402 in FIG. 5) via the short range communication network 116. As discussed above, a wireless communication link (e.g., the wireless communication link 120 in FIG. 4) may serve as a hot spot in a short-range communication network 116. However, in some settings, such as the shopping mall example illustrated in FIG. 5, there is generally sufficient coverage provided by the APs spread throughout the shopping mall. Thus, the short-range communication networks may typically be established using an AP, such as the AP 140 in FIG. 4 or any of the APs shown in FIG. 5. As will be discussed in greater detail below, the API includes a verification system to assure the authenticity of the information received by the UE 400 from the AP 416 and the AP 418.

In FIG. 5, the UE 402 has established wireless communication links 424-426 with the APs 428-430, respectively. As noted above, these APs may be in a large business. As the user moves from one department to another or from one store level to another, he may move in or out of range of one AP or the other. Thus, the information provided to the UE 402 may be customized for the user based on the user's current location within the business.

FIG. 6 illustrates a large venue 440, such as a casino. In such a large venue, there may be related businesses 442-446 located within or near the venue 440. In the casino example, the related business 442 may be a performance venue for singers, comedy acts, and the like. The related business 444 may be a nightclub while the related business 446 may be a restaurant.

Due to the large size of the venue 440, it may be necessary to deploy a network of APs, illustrated by the reference number 448. The position and coverage area of the APs 448 can be determined based on the particular hardware implementation. The actual distribution and installation of the APs 448 within the venue 440 is within the engineering knowledge of one skilled in the art and need not be described in greater detail herein.

In the embodiment of FIG. 6, all of the APs 448 may be coupled to a server (e.g., the server 432 in FIG. 5) or a gateway 450 (see FIG. 7). As the UE 400 moves throughout the venue 440, it is making and breaking wireless communication devices with one or more of the APs 448. The identity of the UE 400 can be verified by the UE providing a profile and user information and signing up for the WiFi service and downloading the API in exchange for free WiFi service. Initially this may be accomplished through a portal page, as will be described in greater detail below.

Once the identity of the UE 400 has been verified, the server 432 can use the installed API in each UE 400 to provide customized messages to the owner of the UE. While the UE 400 remains within the venue 440, it is in substantially continuous contact with the APs 448 and may receive data therefrom. For example, the UE 400 could receive an ad for free or discounted tickets to the performance venue 442 or an invitation to happy hour at the nightclub venue 444 or a discounted meal at the restaurant venue 446. If the owner of a UE 400 is not a registered guest at a hotel within the venue 440, the APs 448 could send an invitation or ad to book a room in the venue 440. The UE 400 can communicate with the server 432 via the APs 448 to accept one or more of the ad offers. For example, the UE 400 could transmit an acceptance and book tickets at the performance venue 442. Similarly, the user of the UE 400 can book a room in the venue 440.

Using the installed API, the venue 440 can establish virtually continuous wireless communication links with the UE 400 and provide a stream of ad content (e.g., ads, offers, discounts, etc.) for the venue 440 and the related businesses 442-446. Thus, the stream of ad data to the UE 400 may be for the venue 440 and the related businesses 442-446. Alternatively, the venue 440 may provide advertising for a different venue (not shown). For example, if the venue 440 is a casino in a large city, such as Las Vegas, the server 432 may provide ad content for a related business down the street or even for a third-party business with whom the venue 440 has contracted to provide advertising to the UE 400. For example, the AP 448 may provide advertising for a convention at a different venue or for a boxing match at a different venue. Thus, advertising content may or may not be related to the venue 440 in which the UE 400 is presently located.

FIG. 7 illustrates a system architecture that allows operation of the system across multiple venues. In FIG. 6, the venue 440 is illustrated with a limited number of UEs 400 and a limited number of APs 448. As discussed above with respect to FIG. 6, the venue 440 may have a large number of APs 448 distributed throughout the venue. The various APs are coupled together using routers, switches, and the like. Those routers, switches and gateways are illustrated in FIG. 7 by the reference 450. Among other things, the gateway 450 allows an interconnection to the network 110 via a communication link 452, but could be any wide area network. In a typical embodiment, the network 110 may be implemented as the Internet. In addition to the communication link 452, the gateway 450 provides a backhaul 454 to a cloud computing environment designated as a JUMMMP Cloud 456. The backhaul 454 may be implemented in a variety of different manners using known technology. In one embodiment, the backhaul 454 may be routed to the JUMMMP Cloud 456 via the network 110.

Within the JUMMMP Cloud 456 are a number of components. A web portal page and policy controller server 458 controls user authentication across a number of different venues in addition to the venue 440. A network management element 460 controls overall operation of the network in the JUMMMP Cloud 456.

FIG. 7 illustrates a number of different web pages that may be downloaded to the UE 400 in the venue 440. In one embodiment, the venue 440 may include its own server and store its own portal pages. However, such an architecture requires that each venue have a separate server to support this functionality. The system in FIG. 7 advantageously utilizes the web portal page server and policy controller server 458 for multiple venues. The JUMMMP Cloud 456 may have some common pages for all venues, such as a log-in web page 462. However, even the log-in web page may be unique to the venue 440.

In addition to the log-in web page 462, the JUMMMP Cloud 456 may have one or more interstitial web pages 464. For example, interstitial web pages may display information about the venue 440 (or advertising for businesses within the venue, third party advertising, or advertising for other venues within the JUMMMP network) while the user is waiting for completion of the registration verification process. In addition, the JUMMMP Cloud 456 may include one or more welcome web pages 466. The welcome web pages 466 may offer various services, such as a credit card data entry page, and Internet access sign-up page, a voucher code entry page to permit the user to enter discount voucher data, and the like. For example, the initial registration can provide WiFi connectivity at a certain service level, such as a basic bandwidth. However, the welcome pages may include an offer to upgrade WiFi connectivity to a higher bandwidth for an advertised price. If the user is a guest at the venue 440, the charge can be automatically made to the user's room. In another embodiment, the user's phone may be charged for the upgraded bandwidth service. Other similar services may be provided in the welcome web pages 466.

One skilled in the art will appreciate that the interstitial web pages 464 and the welcome web pages 466 may be unique to the venue 440. Even though these web pages may be unique to the venue, the centralized web portal page server 458 within the JUMMMP Cloud 456 simplifies the overall system architecture within the venue 440 and within other venues by eliminating the need for a portal page server within each venue.

A local ad server 468 in the JUMMMP Cloud 456 may provide ads for the venue 440. As discussed above, the ads may be for the venue 440 itself or for the related businesses 442-446 (see FIG. 6). In addition, the ads may be for businesses near the venue 440 (or for other venues in the JUMMMP network). The centralized ad server 468 in the JUMMMP Cloud 456 simplifies the network architecture within the venue 440 and other venues by eliminating the need for an ad server within each venue. Even through the ad server 468 is centralized within the JUMMMP Cloud 456, it may contain a plurality of local ads for each of a number of different venues.

A data base server 470 in the JUMMMP Cloud 456 may be configured to collect a broad range of information regarding the UEs 400 (including the user profile information from the data storage area 184 (see FIG. 2) that was provided via the API when the UE was first identified in the venue. The profile information will help provide targeting marketing and advertising to the UE as it traverses the venue). As previously discussed, data messages may include geo-location data. The geo-location data (e.g., longitude and latitude) can be obtained in several possible ways. In one embodiment, the wireless communication device (e.g., the UE 400 in FIG. 7) may have built-in GPS. Other possible location determination technologies include WiFi, 3G, approximation triangulation, or last-known location of the user. Other known location technologies may also be implemented in the system 100. For example, the UE 400 will communicate with different ones of the access point 448 in the venue 440 shown in FIG. 6. As the UE 400 moves throughout the venue, new communication links are established with nearby access points 448. By identifying which access point 448 the UE 400 is communicating with, it is possible to determine the location of the UE 400 with a reasonable degree of accuracy.

The database server 470 is configured to store location information, along with time/date data to thereby track movements of the UE 400. In one embodiment, the database server 470 can also be configured to store message data from the UEs 400 throughout the system 100. In yet another embodiment, the database server 470 may also store user profiles for the UE 400 as well as profile data collected by the UE 400 from other JUMMMP users. In one configuration, the API, which is installed on the UE 400 as part of the verification process described above, is configured to generate a "heartbeat" signal that periodically reports location data back to the database server 470. The location data may include a time/date stamp to provide location information for the UE 400. This information can be useful for marketing purposes. Using the example of FIG. 6, where the casino venue 440 includes a large area as well as related businesses 442-446, the database server 470 can determine how long the UE 400 remains in a particular area (e.g., one area of the casino), how many times and how long the UE remains at the bar, in a nightclub or the like. By collecting this information, the database server 470 can establish a user profile for the UE 400 for marketing purposes.

The JUMMMP Cloud 456 also includes an IP transfer point 472, which is coupled to a mobile operator network 474 via a communication link 476. As those skilled in the art will appreciate, mobile data offloading, also called data offloading, involves the use of complementary network technologies for delivering data originally targeted for cellular networks, such as the mobile operator network 474. In areas where the cellular network traffic is heavy, network congestion may occur. To reduce congestion, mobile network operators sometimes set up WiFi access points in areas of congestion and allow some of the data originally targeted for the mobile operator network 474 to be carried by the WiFi network. Rules triggering the mobile offloading action can be set by an end user (i.e., the mobile subscriber) or the mobile network operator. The software code operating on the offloading rules can reside in the UE 400, in a server, or divided between these two devices. For the end users, the purpose of mobile data offloading may be based on the cost for data service and the ability of higher bandwidth. For mobile network operators, the main purpose for offloading is to reduce congestion of the cellular network. The primary complementary network technologies used for mobile data offloading are WiFi, femtocells, and integrated mobile broadcast.

In a typical embodiment, each mobile network operator has its own WiFi network to offload data that would otherwise be carried on its particular mobile operator network. In the context of FIG. 7, the APs 448 within the venue 440 do not belong to the operator of the mobile operator network 474 as is normally the case in data offloading. In the implementation described in the present disclosure, the data offloading is provided by the venue 440 through contract with the mobile operator network 474. Although FIG. 7 illustrates only a single mobile operator network 474, those skilled in the art will appreciate that it is representative of one or more mobile operator networks. In operation, each mobile operator network contracts with the venue 440, either directly or with the JUMMMP Cloud 456, to provide data offloading in the venue. When the UE 400 enters the venue, the mobile network operator is notified and the mobile operator network 474 can determine whether or not to offload data traffic for that UE. If data offloading for the UE is approved in accordance with the rules described above, Internet access, text messaging, and even telephone calls can be provided to the UE 400 via a connection from the mobile operator network 474 through the communication link 476 to the IP transfer point 472 within the JUMMMP Cloud 456. In turn, that offloaded data is routed through the backhaul 454 to an AP 448 and ultimately to the UE 440. Similarly, outgoing calls from the UE 400 may be routed in the reverse fashion. This approach has the beneficial effect of offloading traffic from an otherwise congested mobile operator network 474. In addition, the mobile network operator may find improved performance because direct communication with the UE 400 through a base station (e.g., the base station 104 in FIG. 1) may not work well when the UE 400 is inside a building, such as the venue 440. Thus, improved reception and reduction in network congestion are double benefits of the IP offloading provided by the JUMMMP Cloud 456.

In the embodiment of FIG. 7, the policy server controller 458 may function as a registration server to assure the authentication of the UE 400. Those skilled in the art will appreciate that the components shown in the JUMMMP Cloud 456 are illustrated as individual elements. In one embodiment, a single policy controller server 458 may be sufficient for a large area, such as the entire country. Indeed, in one embodiments, a single policy controller server 458 may provide registration services for the entire system 100. However, those skilled in the art will appreciate that the policy controller server 458 may be illustrative of a number of different computing platforms designed to implement the functionality of the policy controller server. In one embodiment there may be a policy controller server for large cities, individual states, regions of the country, or an entire country. In another embodiment, the policy controller server 458 may be implemented in a hierarchical fashion where a local or regional policy server controller 458 contains local and regional data, but may communicate with regional or national policy controller servers 458 on a higher hierarchical level. For example, if the UE 400 performs an initial registration in one city, that registration data may be stored in a local implementation of the policy controller server 458 and reported to a regional or national level of the policy controller server. In this manner, the registration data may be efficiently distributed throughout a wide area. As will be discussed in detail below, this arrangement also facilitates easy subsequent authentication of the UE 400.

The UE 400 must register with the system 100 at some initial point in time. The initial registration can be performed remotely using, by way of example, a laptop or PC 110 (see FIG. 1) connected to the JUMMMP Cloud 456 via the network 110. In another variation, the UE can perform an initial registration as it enters the venue 440 illustrated in FIG. 7, as described above. When the UE 400 initially contacts the AP 448, the policy controller server 458 will not have any data related to a particular UE 400. In this case, that initial AP 448 in the venue 440 may perform an initial registration. For the initial registration, the UE 400 can connect to the initial AP 448 and provide identification information. In an exemplary embodiment, the user can complete the initial registration process by providing data, such as the telephone ID (i.e., the phone number), a device ID, a user ID, and an email address as well as other information, such as the user profile in the data storage area 184 (see FIG. 2). The user ID may be a user generated name, nickname, or the like. The device ID may vary based on the particular type of the UE 400. For example, if the UE 400 utilizes an Android™ operating system, the device will be assigned an Android™ ID. In addition, the UE 400 may typically be assigned an international mobile equipment identification (IMEI). Any of these device identifications alone may be transmitted to the registration server 460. In another alternative embodiment, a unique hash of one or more device IDs may be generated and transmitted to the registration server 460 as the device ID. The short-range transceiver 176 (see FIG. 2) may also include an identification, such as a MAC address that is unique to the UE 400. The registration data described above can be provided to the registration server 460 along with the MAC address. As part of the initial registration process, the API is downloaded and installed on the UE 400. As part of the registration process, the user can review and accept any terms and conditions for installation of the API. The registration data may be stored in association with the MAC address. Once the initial registration process has been completed, subsequent authentications are greatly simplified. Once the initial registration process is completed, the web portal page server 458 may transmit other pages, such as the log-in web page 462, one or more interstitial web pages 464, and the welcome web page 466 shown in FIG. 7.

The UE 400 can also perform the initial registration using a conventional wireless service provider network. As previously discussed the UE 400 can communicate with the RAN 406 (see FIG. 5) via the wireless communication link 408 in a conventional manner. Those skilled in the art will appreciate that the UE can access the network 110 via the RAN 406. Conventional wireless service provider components, such as a gateway to the network 110 are known in the art, but not illustrated in FIG. 5 for the sake of clarity. In one embodiment, the UE 400 can perform a registration process with the registration server 460 via the RAN 406. In this embodiment, the UE 400 accesses a website, such as the JUMMMP network website 200 illustrated in FIG. 3. In this example, the registration server 460 may be associated with the JUMMMP network website 200 (see FIG. 3) or the JUMMMP Cloud 456 of FIG. 7. In this embodiment, the API may be downloaded and installed on the UE 400 via the RAN 406. Again, the user can review and accept the terms and conditions as part of the API installation process.

Alternatively, the UE 400 may perform an initial registration using a conventional computer (e.g., the user computing device 112 of FIG. 1) to provide the registration data for the UE 400 to the policy controller server 458. For example, the user may make a reservation to visit a hotel, such as the casino venue 440 illustrated in FIG. 6. In a confirmation email from the hotel, the user may be invited to perform a registration process with the registration server using, by way of example, a link to a registration web page. If the user has previously registered the UE 400 with the policy controller server 458, the user can simply provide a message to the policy controller server 458 that the user (and the UE 400) will soon be in Las Vegas. The policy controller server 458 can download the authentication information to the local or regional registration server associated with the geographic locale of the casino venue 440. In addition, the registration server 460 may preload the data in the Allowed List 184a and the Blocked List 184b in the UE even before the UE 400 arrives in Las Vegas.

If the UE registration occurs at the venue via an AP (e.g., the AP 448 in FIG. 7), the policy control server 458 knows the geographic locale of the UE 400. The downloaded data for the Allowed List 184a (see FIG. 2) and the Blocked List 184b are lists of authenticated and unauthenticated APs in the geographic region in which the UE 400 is presently located. In this manner, the UE 400 knows that information, such as messages, coupons, advertisements, and the like are received from valid and registered businesses. At the same time, the UE 400 will block such data if the AP sending such data is in the Blocked List 184b.

In one embodiment, a previously-registered UE 400 may come within range of the initial AP 448 in the venue 440 of FIG. 7 and establish a wireless communication link therewith. In establishing the communication link, the API will cause the UE 400 to transmit its MAC address and/or the phone ID or IMEI. The AP 448 transmits an authentication request message to the registration server 416 to determine whether the UE 400 is a registered device. Based on the MAC address, the registration server can confirm that the UE 400 has previously registered. Thus, the UE 400 is automatically authenticated whenever it comes into range of an AP 448 of the system 100. This may occur transparently to the user. This automatic authentication process can occur even if the initial registration was in a completely different part of the country. Thus, the UE 400 may move from one venue 440 to another in the same city or region or may be in a completely different part of the country and be automatically identified and authenticated with APs that are part of the system 100 described herein. This convenient registration and authentication avoids the need for constantly searching for a WiFi connection as required by other systems. Based on this automatic authentication process, the UE 400 may be automatically connected to the WiFi network created by the APs 448 in the venue. The UE 400 may get welcome greetings from the venue and may also receive advertising, offers, discounts, and the like.

Figure 8:
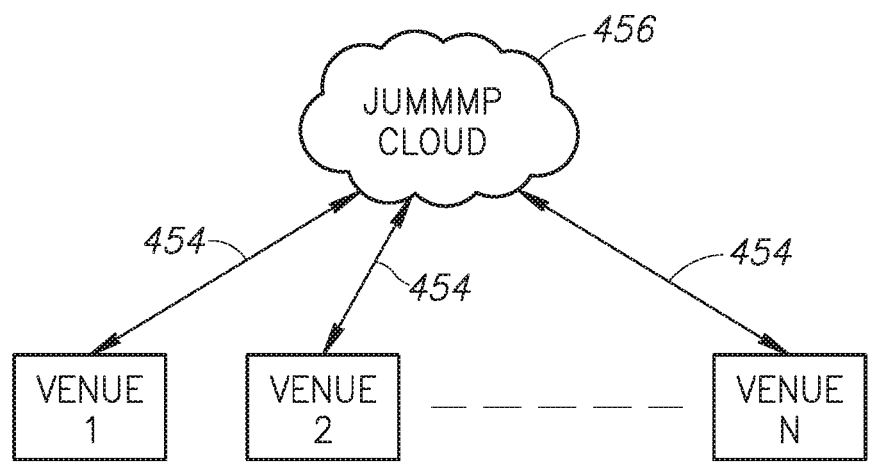
FIG. 8 illustrates the Cloud network of FIG. 7 communicating with multiple venues.

The registration process at a single venue has been discussed above with respect to FIG. 7. The JUMMMP Cloud 456 also advantageously provides a centralized registration function for multiple venues, as illustrated in FIG. 8. The multiple venues 440 are each connected to the JUMMMP Cloud 456 via individual respective backhauls 454. If a UE 400 initially registers at Venue 1, using the registration process described above, that registration information is stored in the JUMMMP Cloud 456. At a later point in time when the user enters, by way of example, Venue 2 illustrated in FIG. 8, the API in the UE 400 will automatically identify the AP 448 and begin to communicate therewith. Because the UE 400 has already been registered, that information is passed along to the JUMMMP Cloud 456 and the Allowed List 184a (see FIG. 2) and the Blocked List 184b are automatically downloaded to the UE 400 for its new current location. This is true even if the various venues 440 are located far from one another. For example, an initial registration of the UE may take place at a sports venue in, by way of example, New York City. However, if the UE 400 is carried to a casino in, by way of example, Las Vegas, Nev., the UE 400 will automatically begin to communicate with the AP 448 in the new venue in Las Vegas. Because each venue is coupled to the JUMMMP Cloud 456, the UE 400 need not undergo another registration process when it enters the venue 440 in Las Vegas. Thus, a single registration process at any venue is sufficient for registration with the JUMMMP Cloud 456. Whenever the UE 400 goes into a different venue 440 that is coupled to the JUMMMP Cloud 456, the UE 400 is automatically recognized and authenticated. During the automatic authentication process, the JUMMMP Cloud 456 may provide interstitial portal pages 464 to the UE 400. Upon completion of the automatic registration process, welcome portal pages 466 may then be transmitted to the UE 400.

Much of the programming functionality described above with respect to the UE is the result of the API executing on the UE. As the UE enters a particular venue (e.g., the venue 440 in FIG. 6), the UE 400 performs the automatic authentication process described above and allows the venue to manage the user's WiFi experience.

In addition, the API, once installed as a service on the UE 400, can control the handset in terms of the content that can be pushed in the venue WiFi environment. Unlike an application program, which must be actively executing, the push of content can be delivered to the UE 400 by the API without any application actively running. For example, the API executing on an Android smartphone can have content that pops up on the phone while the API is running. The pushed content, in addition to the social networking aspects of the API discussed above, can include advertising, point-of-sale, and multi-cast streaming video.

In addition, the API executing on the UE 400 can pull advertising data. For example, the API can pull advertising data from the local ad server 468 (see FIG. 7) when the API initially connects to the AP 448. In addition, the API can pull further ads from, by way of example, the local ad server 468, when the API sends a heartbeat signal. In addition, the API can also pull for ads at any time.

As discussed above, the API works in support of a push advertising platform in support of a WiFi network. The ads may be in the form of promotions, offers, discounts, and the like and are simply collectively referred to as ads. Operating in conjunction with the network 110, such as the Internet, the venue can push a number of different ads to the UE 400. For example, the ads may include banner ads that provide a link to a website. On that website, any type of content, ad, video, audio, images, etc. can be shown. When clicked by the user, the banner ad can also download an application or an animated ad, or full screen banner ads. The ads may be provided directly by the venue 440, or retrieved from the local ad server 468 (see FIG. 7). In addition, the ads may be provided from an internal or third-party ad server.

Alternatively, ADMOB ads can be downloaded using an application program. ADMOB is a third part company that specializes in delivery of advertising to mobile units. However, those skilled in the art will appreciate that the ads can be provided to the API by any internal or third-party ad server.

In an alternative embodiment, an ad may be provided to the UE 400 by a super user. A super user is an individual that has been authorized to push ads to the UE. For example, the maître-d in a restaurant in a hotel, resort complex or casino may be authorized to send ads to the UEs 400 to provide selected deals for the restaurant. The super user can decide to push ads to users that are just outside the restaurant by selectively targeting certain APs 448 that are near the restaurant or the ad can be pushed to all APs within the entire facility. In another example, a casino theater/nightclub may have a large number of empty seats shortly before show time. In this example, a club manager may be a super user and can send an ad for discounted ticket prices (e.g. 50% off) to the UEs 400. Again, the ad may be targeted to APs near the theater/nightclub or to all Aps throughout the facility. Thus, a super user is an individual designated to authorize the delivery of ads to the UEs 400 on an "as-needed" basis. As discussed above, ads refer generically to advertisements of any form, including, but not limited to text ads, pop-up menus, video, audio, images, and the like. In one embodiment, the super user may be able to select the ad type from among a plurality of available ads. For example, an initial ad may simply be a text message offering a small percentage discount, while a subsequent ad may be a banner ad or a full screen image offering a greater discount. In yet another alternative embodiment, the super user may send a link to website containing the actual ad.

In yet another embodiment, a quick response (QR) code can be pushed to the UE 400. A QR code is a two-dimensional bar code matrix. Those skilled in the art will appreciate that the QR code can be used to send actual data from the UE 400 to a website.

As previously discussed, messages sent to the UE from the venue 440 can take the form of an image, PDF file, video, audio, link to a website, actively pop-up a website, or may include text messages. As described above, text messages may be in the form of public text messages intended for multiple UEs 400 or a private text message intended for a single UE. In addition, the API can review and activate a command to open up an application remotely. For example, when the UE 400 walks within proximity of the AP 448, an application can be automatically opened up. The remote activation of an application can be controlled to be a public activation for any UE 400 that moves within range of an AP 448 or can be targeted to individual UEs as a private ad.

The use of the Allowed List 184A and Blocked List 184B (see FIG. 2) has been discussed above. In the context of the API, the Allowed List 184A and Blocked List 184 B can be used by the UE to identify verified enterprise users within the venue 440 itself or to any venue coupled to the JUMMMP Cloud 456 (see FIG. 7). The Allowed List 184A and the Blocked List 184B are generated for the API at API start-up. In one embodiment, the Allowed List 184A and Blocked List 184B may be downloaded from the JUMMMP Cloud 456. In an exemplary embodiment, the JUMMMP Cloud 456 may provide verification of enterprise users in a geographic area surrounding the present location of the UE 400. For example, if the UE 400 is presently in a venue 440, such as a casino in Las Vegas, the JUMMMP Cloud 456 may download the Allowed List 184A and the Blocked List 184B for the particular venue in Las Vegas or, for the entire Las Vegas area. In one embodiment, the Allowed List 184A and the Blocked List 184B are downloaded from the JUMMMP Cloud 456 when the API sends a heartbeat signal. Those skilled in the art will appreciate that the Allowed List 184A and the Blocked List 184B can be updated on a continuous basis. Thus, the US 400 maintains up-to-date lists.

The concept of a super user has been discussed above. In an exemplary embodiment, the device ID of the device being used by the super user must be verified and contained in the Allowed List 184A. A corporation or business entity can also be designated as a corporate super user. In this embodiment, corporate super users can enter their corporate ID in their profile and, if the corporate ID is contained within Allowed List 184A, the corporate super users will be able to send verified ads regardless of the actual device ID. In this manner, individual verified users and corporate-wide users can be verified for the UE 400.

The concept of automatic user verification in multiple venues has been discussed above with respect to FIG. 8. That is, once a user is registered and verified in one venue, that user information is associated with the UE 400 and that information is stored In the JUMMMP Cloud 456. At a Later date, when the user enters another venue coupled to the JUMMMP Cloud 456, the UE 400 is automatically identified and verified by virtue of the previous registration. Thus, the API permits automatic verification across multiple venues. In the context of advertising, it is possible to provide ads from one venue to another. For example, someone from Los Angeles visiting Las Vegas could receive local ads from, by way of example, the MGM casino, as well as ads from one of the baseball teams in Los Angeles for use when the user returns home.

When a UE 400 enters a new venue 440 that is coupled to the JUMMMP Cloud 456, automatic verification is performed, as described above. Upon verification, the API can remotely activate an application, as described above. The application can be automatically updated on the UE 400 for the particular venue 440. In addition, the application can provide a new "skin" for the UE 400 that is unique to that particular venue.

Because the API remains on the UE 400, it remains active unless the user uninstalls it. In the absence of removal of the API, the UE 400 will be tracked by heart beats that are sent to the JUMMMP Cloud 456 on a defined time interval. As a result, the UE 400 can continue to receive ads, text messages, and the like that will be pushed to the phone by any venue coupled to the JUMMMP Cloud 456. If two UEs 400 have both installed the API and have left a venue 440, the two devices can still communicate with each other using the short-range communication network 116 as previously described.

Figure 9:
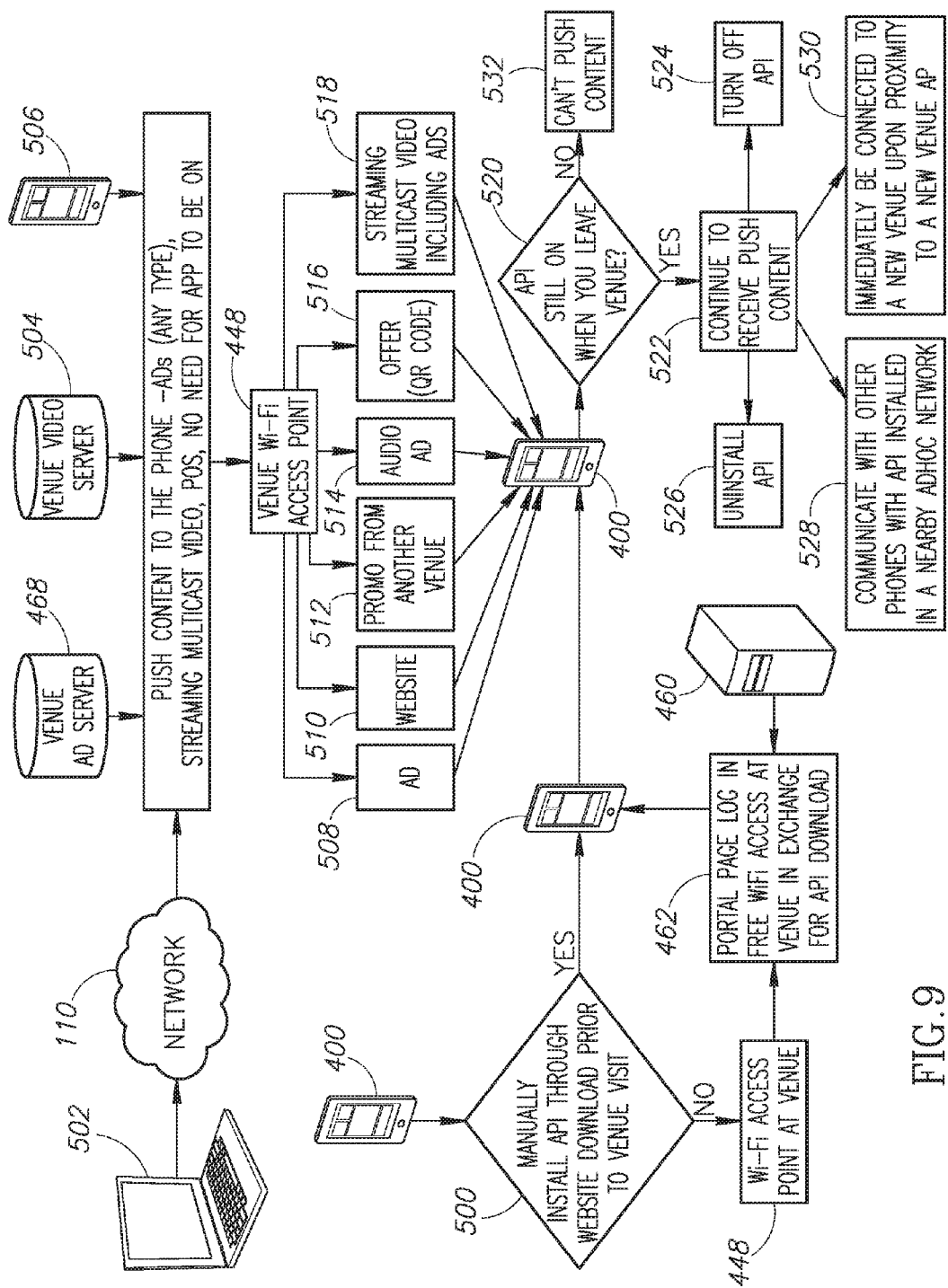
FIG. 9 illustrates content push technology in a venue facilitated by an application programming interface on user equipment.

FIG. 9 graphically illustrates the interconnectivity of the various components discussed above. The user may be contacted through an email or similar communication to download the API to the UE 400 prior to a visit to any venue. This is illustrated at 500 in FIG. 9. If the UE 400 has the API pre-installed, it is automatically verified whenever the UE 400 comes within range of any AP 448 coupled to the JUMMMP Cloud 456. If the user chooses not to pre-install the API, the user may manually connect to an AP 448 when the user arrives at the venue 440. In this event, the user is provided a portal page login 462 (see FIG. 7) at which point the user may provide information and download the API. In an exemplary embodiment, the venue 440 may offer incentives, such as free WiFi access at the venue in exchange for downloading the API. Details of the registration process have been discussed above with respect to FIG. 7.

If the user has manually installed the API prior to a visit to the venue 440, or has previously visited a venue 440 and downloaded the API, the UE 400 is automatically recognized whenever the user enters a venue 440 that is coupled to the JUMMMP Cloud 456. The automatic authentication process has been described above. In addition, any updates to the API may be automatically installed whenever the UE undergoes the automatic verification process. In this embodiment, the initial verification may include an indication of the current software version of the API to allow the UE 400 to determine whether it has the most current software. If not, the UE 400 can automatically request the updated software version of the API. Furthermore, any associated APs can also be updated upon identification/verification.

Once the registered and authenticated user has entered a venue 440 (see FIG. 7), the API will automatically communicate with the one or more APs 448. As illustrated in FIG. 9, the venue 440 comprises a number of different avenues by which it may push content to the UE 400 including ads of any type, streaming multicast video, point-of-sales information, and the like. As noted above, the API resident within the UE 400 permits the reception of content by the UE. It is not necessary for an application program to be currently executing to receive such content. As illustrated in FIG. 9, the system may include an enterprise POS website 502 to provide point-of-sales information and sales opportunities to the UE 400. The POS information may be ads of any sort, discount prices, free services, or the like. The enterprise POS website 502 may be resident within the venue 440 or coupled to the network 110 to deliver its content.

The enterprise POS website 502 can provide a secure website connection via the network 110 or directly through the infrastructure at the venue 440 to communicate with one or more of the APs 448. In one embodiment, the user may provide credit card information during the initial registration process. If so, the enterprise POS website 502 can access a secure connection to retrieve the credit card information. Alternatively, the user may transmit the credit card information to the enterprise POS website 502 via a secure connection using, by way of example, a private communication. The enterprise POS website 502 can provide secure web pages for credit card information in this embodiment. The enterprise POS website 502 can also provide information regarding food and/or merchandise menus for ordering. The venue APP can be configured to provide seating location to a vendor as well as the food/merchandise order and credit/cash transaction payment to permit the order to be delivered to the guest. For example, the venue 440 may be a sports venue. In this example, the UE 400 may access the enterprise POS website 502 to order food to be delivered directly to the user's seat within the sports venue. In addition, the user may order merchandise, such as a program, sports jersey, and the like. In this example, the food and/or merchandise can be delivered directly to the user. Upon completion, the transaction can be recorded, and a percentage of the financial transaction can flow to the service provider.

The venue may also include the venue ad server 468, described above with respect to FIG. 7. The venue 440 may also include a venue video server 504. As those skilled in the art will appreciate, the nature of the video delivered by the venue video server 504 may be venue dependent. For example, if the venue 440 is a sports stadium, the venue video server 504 can deliver streaming multicast video of replays, close-ups, or video from multiple vantage points. Similarly, if the venue is a race track, the venue video server 504 may deliver video showing views from different portions of the race track, on-board video cameras mounted to the race cars, replays, and the like. In yet another example, a casino venue 440 may use the venue video server 504 to deliver video instructional services for different games (i.e., poker, blackjack, roulette, and the like). The venue video server in a casino venue can also deliver streaming multicast video of performances in a nightclub/theater within the casino. Thus, the venue video server is a flexible device that can deliver various forms of video to the UE 400 via one or more APs 448.

In addition, FIG. 9 illustrates a super user 506. As discussed above, certain individuals or corporate super users can be authorized to deliver ads to the UE on short notice.

FIG. 9 also illustrates the type of contact that can be delivered from the AP 448 to the UE 400, including an ad 508, content from anther website or a link to another website 510, a promotion from another venue, an audio ad 514, a QR code 516, and streaming multicast video 518, which may include streaming video as described above, or yet another form of ad messaging to the UE 400.

When the UE leaves the venue 440, it may still be able to receive push content. If the AP is still active when the UE exits the venue at 520, it can continue to receive push content at 522. To stop receiving push content, the user can turn off the API at 524 or uninstall the API at 526. However, if the user of the UE 400 elects to keep the API active, the UE 400 can communicate with other phones having the API installed using the short-range networks at step 528. The dynamic formation, maintenance, and termination of short-range communication networks 116 have been described in detail above.

Another advantage of maintaining the API in an active state is that the UE 400 will automatically be authenticated, at step 530, whenever the UE 400 comes within range of an AP 448 coupled to the JUMMMP Cloud 456.

If the API has been turned off or uninstalled at decision 520, the system 100 is unable to push additional content at step 532. Furthermore, the UE will be unable to form any short-range communication networks 116 and will not be automatically authenticated when the user reenters the original venue 440 or enters a new venue 440 coupled to the JUMMMP Cloud 456.

The multicast streaming video will be sent through the network of APs 448 and directed to the UE 400. The streaming video can be played locally on the UE 400 with a conventional multicast video player. In addition, video ads can be interstitially placed in the video stream as an additional source of ad revenue. Furthermore, static and dynamic ads can be placed in the video player for additional ad revenue. For example, the streaming video may contain a banner ad above or below the actual video content. The banner ads may also provide a link to the website 510.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system comprising:
an authentication server configured to store registration data in association with each of a plurality of wireless communication devices and to receive an authentication request from each of the plurality of wireless communication devices and, in response to each authentication request, to verify an identity of the wireless communication device transmitting the request based on authentication data contained in the authentication request and the stored registration data associated with the wireless communication device transmitting the request;
a plurality of wireless access points associated with a venue, and distributed throughout the venue, the plurality of wireless access points being configured to receive the authentication requests from a short-range transceiver in each of the respective wireless communication devices, a first of the plurality of wireless access points that detects an authentication request from a first of the plurality of wireless communication devices being configured to communicate with the authentication server and to provide the authentication data to the authentication server, and, when the identity is verified such that the first wireless communication device is authenticated, to establish a communication link between the first wireless communication device and one or more of the plurality of wireless access points such that the communication link is maintained so long as the first wireless communication device is within range of at least one of the plurality of wireless access points; and
a content server configured to deliver video data content to the authenticated wireless communication device via the communication link.

2. The system of claim 1 wherein the content server is located in the venue.

3. The system of claim 1 wherein the content server is located in a location remote from the venue.

4. The system of claim 1 wherein the authentication server is further configured to initiate an initial registration for the first wireless communication device upon failure to the first wireless communication device and the first wireless communication device is not authenticated, the first of the plurality of wireless access points being configured to receive the registration data comprising a device identification code from the unauthenticated wireless communication device.

5. The system of claim 4, further comprising a video data source wherein the video data content comprises interstitial data delivered from the video data source to the wireless communication device during the initial registration.

6. The system of claim 1 wherein the venue has a plurality of vendors and the video data content is video data from one of the plurality of vendors delivered to the wireless communication device via the communication link.

7. The system of claim 6 wherein the venue approves each of the plurality of vendors and the video data content is video data from an approved vendor delivered to the wireless communication device via the communication link.

8. The system of claim 1 wherein the video data content comprises video advertising data.

9. A system for the authentication of a plurality of wireless communication devices, each having a short-range transceiver in a plurality of venues, comprising:
- at least one wireless access point within each of the plurality of venues, the wireless access points in each of the plurality of venues being configured to transmit a predetermined beacon signal;
- a venue communications interface within each of the plurality of venues, each venue communications interface being communicatively coupled to the access points in the respective venue, and also being coupled to a network to control communications between the venue and the network; and
- an authentication server coupled to the network and being configured to store registration data in association with each of the plurality of wireless communication devices and to communicate with each of the plurality of venues via the respective venue communications interfaces,
- wherein a first wireless access point in a first of the plurality of venues receives an authentication request from one of the plurality of wireless communication devices, the authentication request including identification data identifying the wireless communication device transmitting the authentication request;
- wherein the first wireless access point transmits the authentication request to the authentication server via the venue communications interface and the network;
- wherein the authentication server is configured to authenticate the wireless communication transmitting the authentication request device using the received identification data and the stored registration data associated with the wireless communication device transmitting the authentication request to determine whether the wireless communication device associated with the identification data is a registered device, the authentication server authenticating the wireless communication device upon determining that the wireless communication device is a registered device, the authentication server being further configured to send authentication results to the first venue; and
- wherein the wireless communication device can be automatically authenticated in any of the plurality of venues and can maintain a communication link with the venue in which it is authenticated so long as the wireless communication device is within communication range of any of the wireless access points in the venue in which it is authenticated.

10. The system of claim 9 wherein the wireless communication device, if authenticated, can establish a communication link with any of the wireless access points within the first venue.

11. The system of claim 9 wherein the first wireless access point is further configured to perform a manual registration procedure with the first of the plurality of venues if the wireless communication device is not a registered device, the manual registration including providing identification data associated with the wireless communication device; and
- the first wireless access point sending the registration data associated with the wireless communication device to the authentication server via the first venue communications interface and the network, for future authentication.

12. The system of claim 9 wherein the central authentication server is located remotely from the plurality of venues.

13. The system of claim 9 wherein a plurality of vendors in geographic proximity to each of the plurality of venues are registered with the respective venue as authenticated, the venue in which the wireless communication device has been authenticated being further configured to automatically transmit to the authenticated wireless communication device, via a wireless access point within the venue, a list of authenticated vendors in a geographic region proximate the venue in which the wireless communication device has been authenticated.

14. The system of claim 9 wherein the wireless access points in the venue in which the wireless communication device has been authenticated are further configured to receive a periodically transmitted signal from the wireless communication device so long as the communication link with the access point is still established.

15. The system of claim 14 wherein the periodically transmitted signal comprises data indicative of a current location of the wireless communication device.

16. A method for the authentication of a wireless communication device in a plurality of venues wherein the wireless communication device comprises a short-range transceiver, the method comprising:
- each of the plurality of venues having at least one access point with the access points in each of the plurality of venues;
- a first wireless access point in a first of the plurality of venues receiving an authentication request from the wireless communication device using the short-range transceiver, the authentication request including the identification data associated with the wireless communication device;
- an authentication server receiving the identification information from the first wireless access point and performing an authentication process using the received identification data to determine that the wireless communication device associated with the identification data is a registered device, the authentication server authenticating the wireless communication device upon determining that the wireless communication device is a registered device;
- sending authentication results from the authentication server to the first venue; and
- upon authentication of the wireless communication device, establishing a communication link between the authenticated wireless communication device and any of the wireless access points in the first venue wherein the wireless communication device can be automatically authenticated in any of the plurality of venues and can maintain a communication link with the venue in which it is authenticated so long as the wireless communication device is within communication range of any of the wireless access points in the venue in which it is authenticated.

17. The method of claim 16, further comprising:
- using the short-range transceiver to perform a manual registration procedure with the first of the plurality of venues if the wireless communication device is not a registered device, the manual registration including providing identification data associated with the wireless communication device; and
- sending the registration data associated with the wireless communication device to the authentication server for future authentication.

18. The method of claim 16 wherein the authentication server is located remotely from the plurality of venues.

19. The method of claim 16 wherein the wireless communication device automatically searches for an access point transmitting a predetermined beacon signal and automatically transmits the authentication request to a detected wireless access point transmitting the predetermined beacon signal.

20. The method of claim 16 wherein a plurality of vendors in geographic proximity to each of the plurality of venues are registered with the venue as authenticated, the method further comprising automatically sending the authenticated wireless communication device a list of authenticated vendors in a geographic region proximate the venue in which the wireless communication device has been authenticated upon establishing the communication link with the access point.

* * * * *